United States Patent
Tsai et al.

(10) Patent No.: US 9,946,406 B2
(45) Date of Patent: Apr. 17, 2018

(54) OPTICAL FILM WITH TOUCH FUNCTION

(71) Applicant: Industrial Technology Research Institute, Hsinchu (TW)

(72) Inventors: Yi-Shou Tsai, Taipei (TW); Kuo-Chang Lee, Pingtung County (TW); Chih-Chia Chang, Hsinchu County (TW); Yi-Chuan Lu, Kinmen County (TW); Ying-Ting Liou, Hsinchu County (TW); Kai-Ming Chang, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 164 days.

(21) Appl. No.: 14/985,370

(22) Filed: Dec. 30, 2015

(65) Prior Publication Data

US 2016/0313864 A1    Oct. 27, 2016

Related U.S. Application Data

(60) Provisional application No. 62/150,859, filed on Apr. 22, 2015.

(30) Foreign Application Priority Data

Nov. 5, 2015    (TW) .............................. 104136458 A

(51) Int. Cl.
*G06F 3/041*    (2006.01)
*G06F 3/042*    (2006.01)
(Continued)

(52) U.S. Cl.
CPC .............. *G06F 3/0421* (2013.01); *G02B 1/16* (2015.01); *G02B 5/201* (2013.01); *G06F 3/044* (2013.01)

(58) Field of Classification Search
CPC ......... G06F 3/0421; G06F 3/044; G02B 1/16; G02B 5/201
See application file for complete search history.

(56) References Cited

U.S. PATENT DOCUMENTS

| | | |
|---|---|---|
| 8,471,446 B2 | 6/2013 | Eom et al. |
| 8,537,311 B2 | 9/2013 | Fletcher et al. |

(Continued)

FOREIGN PATENT DOCUMENTS

| | | |
|---|---|---|
| CN | 1805630 | 7/2006 |
| CN | 101320107 | 12/2008 |

(Continued)

OTHER PUBLICATIONS

Ronald S. Cok, et al., "P-155: Ambient Contrast for OLED Displays," SID Symposium Digest of Technical Papers, vol. 38, Issue 1, May 2007, pp. 784-787.

(Continued)

*Primary Examiner* — Jonathan Boyd
(74) *Attorney, Agent, or Firm* — JCIPRNET

(57) ABSTRACT

An optical film with touch function includes a substrate, a material layer, a plurality of columnar structures, and a filter electrode layer. The substrate has a carrying surface. The material layer is disposed on the carrying surface of the substrate. Each of the columnar structures is extended from a side of the material layer adjacent to the carrying surface to a side of the material layer away from the carrying surface. A side of each of the columnar structures adjacent to the substrate has a first end surface. The filter electrode layer is disposed between the substrate and the material layer. The filter electrode layer includes a plurality of sensing electrode regions electrically insulated from each other. The filter electrode layer has a plurality of openings, and the openings respectively expose the first end surfaces.

20 Claims, 24 Drawing Sheets

(51) Int. Cl.
*G06F 3/044* (2006.01)
*G02B 5/20* (2006.01)
*G02B 1/16* (2015.01)

(56) References Cited

U.S. PATENT DOCUMENTS

| | | | |
|---|---|---|---|
| 8,550,667 | B2 | 10/2013 | Kim et al. |
| 8,743,466 | B2 | 6/2014 | Yamamoto |
| 8,917,252 | B2 | 12/2014 | Kuriki |
| 2010/0079870 | A1 | 4/2010 | Cao |
| 2011/0069039 | A1 | 3/2011 | Lee et al. |
| 2012/0086669 | A1 | 4/2012 | Kim et al. |
| 2012/0312677 | A1 | 12/2012 | Kuriki |
| 2012/0327020 | A1 | 12/2012 | Kohara et al. |
| 2013/0044384 | A1 | 2/2013 | Kim et al. |
| 2013/0113732 | A1 | 5/2013 | Kang et al. |
| 2013/0147742 | A1 | 6/2013 | Lee |
| 2013/0222282 | A1 | 8/2013 | Huang et al. |
| 2014/0022208 | A1 | 1/2014 | Wu |
| 2014/0293160 | A1 | 10/2014 | Tang et al. |
| 2015/0049047 | A1 | 2/2015 | Liao et al. |
| 2015/0109542 | A1 | 4/2015 | Wu et al. |
| 2015/0212540 | A1* | 7/2015 | Tsujimoto ............ G02F 1/13338 345/174 |

FOREIGN PATENT DOCUMENTS

| | | |
|---|---|---|
| CN | 101943970 | 1/2011 |
| CN | 102566838 A | 7/2012 |
| CN | 102736287 | 10/2012 |
| CN | 103677410 | 3/2014 |
| CN | 103901650 A | 7/2014 |
| CN | 203759662 | 8/2014 |
| CN | 104423691 | 3/2015 |
| TW | 200620078 | 6/2006 |
| TW | 201124999 | 7/2011 |
| TW | 201211624 | 3/2012 |
| TW | I393924 | 4/2013 |
| TW | 201321774 A | 6/2013 |
| TW | 201329833 A | 7/2013 |
| TW | I401498 | 7/2013 |
| TW | M472252 | 2/2014 |
| TW | 201418177 | 5/2014 |
| TW | 201423511 | 6/2014 |
| TW | I441053 | 6/2014 |
| TW | M481453 | 7/2014 |
| TW | M484741 | 8/2014 |
| TW | 201441907 | 11/2014 |
| TW | 201445377 A | 12/2014 |
| TW | M494960 | 2/2015 |
| TW | M497344 | 3/2015 |

OTHER PUBLICATIONS

Zhenyue Luo, et al., "Emerging Quantum-Dots-Enhanced LCDs," Journal of Display Technology, vol. 10, No. 7, Jul. 2014, pp. 526-539.

Bo-Ru Yang, et al., "Emi-Flective Display Device with Attribute of High Glare-Free-Ambient-Contrast-Ratio," Japanese Journal of Applied Physics, vol. 46, No. 11, Nov. 2007, pp. 7418-7420.

Jiun-Haw Lee, et al., "High ambient-contrast-ratio display using tandem reflective liquid crystal display and organic light-emitting device," Optics Express, vol. 13, No. 23, Nov. 14, 2005, pp. 9431-9438.

Ranbir Singh, et al., "Improving the contrast ratio of OLED displays: An analysis of various techniques," Optical Materials, vol. 34, Issue 4, Feb. 2012, pp. 716-723.

Hyunseung Kim, et al., "The Advantage on Ambient Contrast Ratio in WRGB OLED Display," SID Symposium Digest of Technical Papers, vol. 44, Issue 1, Jun. 2013, pp. 1464-1465.

Ya-Ting Gao, et al., "Optical Film and Display Assembly Applying the Same," Unpublished U.S. Appl. No. 14/576,221, filed Dec. 19, 2014.

Chih-Chia Chang, et al., "Sensing Apparatus," Unpublished U.S. Appl. No. 14/985,373, filed Dec. 30, 2015.

Ying-Ting Liou, et al., "Sensing Device," Unpublished U.S. Appl. No. 15/135,560, filed Apr. 22, 2016.

"Office Action of Taiwan Related Counterpart Application No. 104137117", dated Aug. 23, 2016, p. 1-p. 9.

"Office Action of Taiwan Related Application,application No. 105100175", dated Oct. 14, 2016, p. 1-p. 8.

"Office Action of Taiwan Counterpart Application", dated Sep. 6, 2016, p. 1-p. 4.

\* cited by examiner

OPTICAL FILM WITH TOUCH FUNCTION

CROSS-REFERENCE TO RELATED APPLICATION

This application claims the priority benefits of U.S. provisional application Ser. No. 62/150,859, filed on Apr. 22, 2015 and Taiwan application serial no. 104136458, filed on Nov. 5, 2015. The entirety of each of the above-mentioned patent applications is hereby incorporated by reference herein and made a part of this specification.

TECHNICAL FIELD

The technical field relates to an optical film with touch function.

BACKGROUND

In recent years, with the rapid development of various applications such as information technology, wireless mobile communications, and information appliances, to achieve the objects of greater convenience, lighter weight, and better usability, the input device of many information products has been converted from a traditional keyboard or mouse, etc. to a touch display panel. Touch input techniques include, for instance, a capacitive touch technique, a resistive touch technique, and an optical touch technique. In the case of the capacitive touch technique, in general, electrodes providing driving voltage and electrodes sensing electrical properties are disposed in a dispersed manner. By sensing the capacitance change between the electrodes providing driving voltage and the electrodes sensing electrical properties, touch input techniques can be achieved.

In general, to achieve both display function and touch function, the electrodes providing driving voltage and the electrodes sensing electrical properties can be formed by a conductive film having light-transmittance properties, such as an indium-tin-oxide (ITO) conductive film, or be formed via a trace method by using a metal wire. However, the costs of a conductive film with light-transmittance properties are very high. Moreover, the desired electrodes are formed by winding metal wires via a specific trace method, and although tough sensing can be achieved, the metal wire is exposed on the display panel, thus affecting light uniformity and panel visibility of the display panel.

SUMMARY

An optical film with touch function in an embodiment of the disclosure includes a substrate, a material layer, a plurality of columnar structures, and a filter electrode layer. The substrate has a carrying surface. The material layer is disposed on the carrying surface of the substrate. The columnar structures are disposed in the material layer. Each of the columnar structures is extended from a side of the material layer adjacent to the carrying surface to a side of the material layer away from the carrying surface. A side of each of the columnar structures adjacent to the substrate has a first end surface. The filter electrode layer is disposed between the substrate and the material layer. The filter electrode layer includes a plurality of sensing electrode regions electrically insulated from each other. The filter electrode layer has a plurality of openings, and the openings respectively expose the first end surfaces.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
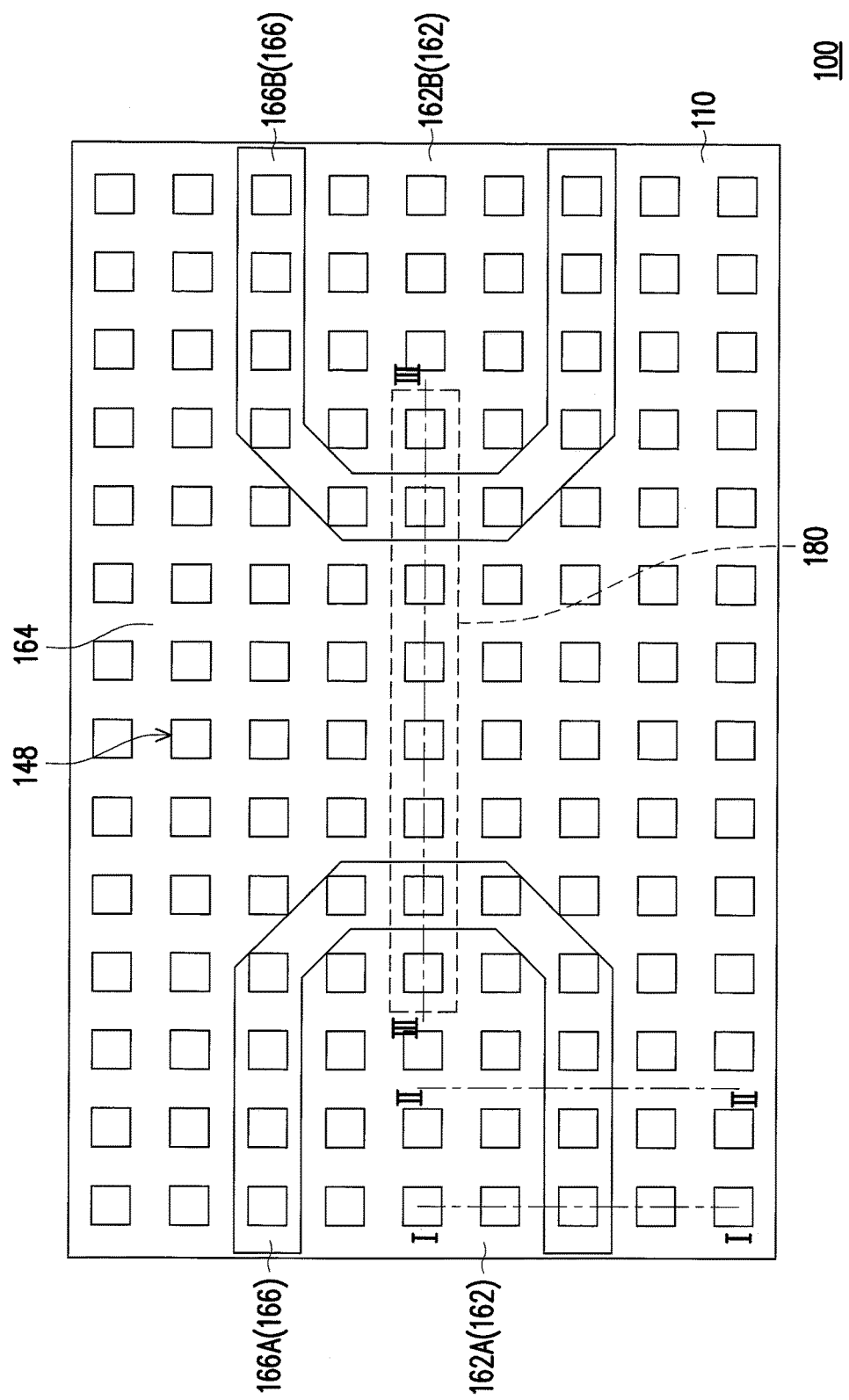
FIG. 1A is a top view of an optical film with touch function of an embodiment of the disclosure.

FIG. 1A is a top view of an optical film with touch function of an embodiment of the disclosure. Please refer to FIG. 1A. Specifically, to clearly express each of the components in the optical film with touch function, an optical film 100 with touch function shown in FIG. 1A is only a portion of a complete optical film with touch function. In the present embodiment, relevant descriptions of the optical film 100 with touch function represent relevant descriptions of the complete optical film with touch function.

In the present embodiment, the optical film 100 with touch function includes a first electrode region 162, a second electrode region 164, and a third electrode region 166. The first electrode region 162 includes first sub-electrode regions 162A and 162B. The third electrode region 166 includes third sub-electrode regions 166A and 166B. The third sub-electrode region 166A is disposed between the second electrode region 164 and the first sub-electrode region 162A, and the third sub-electrode region 166B is disposed between the second electrode region 164 and the first sub-electrode region 162B. In the present embodiment, line I-I passes through the first sub-electrode region 162A, the third sub-electrode region 166A, and the second electrode region 164. Line II-II passes through the first sub-electrode region 162A, the third sub-electrode region 166A, and the second electrode region 164. Line III-III passes through the first sub-electrode region 162A, the third sub-electrode region 166A, the second electrode region 164, the third sub-electrode region 166B, and the first sub-electrode region 162B. In the present embodiment, line I-I, line II-II, and line III-III are used as cutting lines for describing internal components of the optical film 100 with touch function in different regions thereof. Line I-I, line II-II, and line III-III of the present embodiment are not used to limit the disclosure.

Figure 1B:
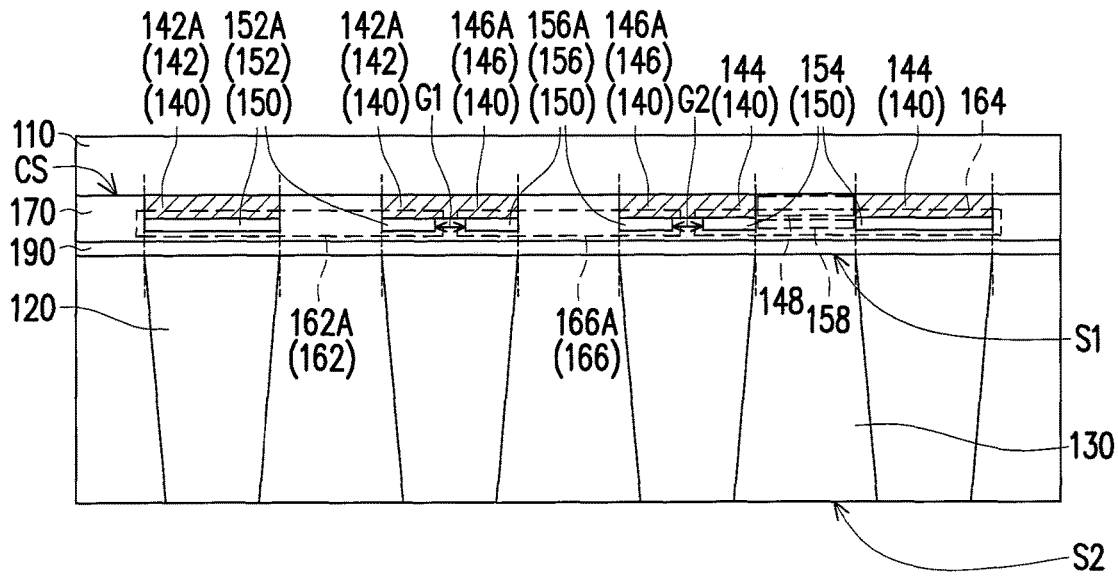
FIG. 1B is a cross-sectional view of the optical film with touch function of the embodiment of FIG. 1A along line I-I.

FIG. 1B is a cross-sectional view of the optical film with touch function of the embodiment of FIG. 1A along line I-I. Please refer to FIG. 1B. In the present embodiment, the optical film 100 with touch function includes a substrate 110, a material layer 120, a plurality of columnar structures 130, and a filter electrode layer. The filter electrode layer of the present embodiment includes a filter layer 140 and a reflective layer 150. The substrate 110 has a carrying surface CS. The material layer 120 is disposed on the carrying surface CS. The filter layer 140 is disposed between the substrate 110 and the material layer 120, and the reflective layer 150 is disposed between the filter layer 140 and the material layer 120. In the present embodiment, the optical film 100 with touch function is suitable to be disposed on a display device (not shown). The display device (not shown) is suitable to be disposed on the surface of a side of the material layer 120 away from the carrying surface CS. The display image beam of the display device enters the optical film 100 with touch function from the surface of a side of the material layer 120 away from the carrying surface CS, and is emitted from another surface of the substrate 110 opposite to the carrying surface CS. In the present embodiment, the display device can be, for instance, a liquid crystal display (LCD), a plasma display, an organic light-emitting diode (OLED) display, an electrowetting display (EWD), an electro-phoretic display (EPD), an electrochromic display (ECD), or other suitable display devices, and the disclosure is not limited thereto.

In the present embodiment, the material of the substrate 110 is a light-transmitting material. The material of the substrate 110 is, for instance, polyimide (PI), polycarbonate (PC), polyethersulfone (PES), polyacrylate (PA), polynorbornene (PNB), polyethylene terephthalate (PET), polyetheretherketone (PEEK), polyethylene naphthalate (PEN), polyetherimide (PEI), glass, or other light-transmitting materials, and the disclosure is not limited thereto.

Please refer further to FIG. 1B. In the present embodiment, the columnar structures 130 are disposed in the material layer 120. Each of the columnar structures 130 is extended from a side of the material layer 120 adjacent to the carrying surface CS to a side of the material layer 120 away from the carrying surface CS. A side of each of the columnar structures 130 adjacent to the substrate 110 has a first end surface S1, and a side of each of the columnar structures 130 away from the substrate 110 has a second end surface S2. In the present embodiment, the first end surface S1 and the surface of a side of the material layer 120 adjacent to the carrying surface CS are coplanar, and the second end surface S2 and the surface of a side of the material layer 120 away from the carrying surface CS are coplanar. However, in some embodiments, the first end surface S1 and the second end surface S2 can respectively protrude beyond the surface of a side of the material layer 120 adjacent to the carrying surface CS and the surface of a side of the material layer 120 away from the carrying surface CS, or the first end surface S1 and the second end surface S2 can be surfaces respectively recessed at a side of the material layer 120 adjacent to the carrying surface CS and a side of the material layer 120 away from the carrying surface CS, and the disclosure is not limited thereto.

In the present embodiment, the materials of the material layer 120 and the columnar structures 130 are light-transmitting materials. The material layer 120 and the columnar structures 130 can be formed by, for instance, a polymer, a resin, a photosensitive resin, a positive photoresist, or a negative photoresist, and the disclosure is not limited thereto. Moreover, in the present embodiment, the index of refraction of the material of the columnar structures 130 is greater than the index of refraction of the material of the material layer 120. The index of refraction of the material of the columnar structures 130 can range from 1.3 to 3.0, preferably from 1.5 to 2.5 in a wavelength range of 380 nm to 780 nm, and the index of refraction of the material layer 120 ranges from 1.0 to 2.7, preferably from 1.2 to 2.2 in a wavelength range of 380 nm to 780 nm. In the present embodiment, the display image beam of the display device (not shown) enters the columnar structures 130 from the second end surface S2 of the columnar structures 130 and is reflected on the junction between the columnar structures 130 and the material layer 120. The display image beam is reflected on the junction between the columnar structures 130 and the material layer 120 and transmitted in the columnar structures 130, and is emitted at the first end surface S1 of the columnar structures 130. In the present embodiment, the columnar structures 130 are prism structures or cylindrical structures. The columnar structures 130 can be, for instance, elliptical columns, square columns, rectangular columns, or rhombic columns. In some embodiments, the columnar structures 130 can also be irregular columns, and the disclosure does not limit the column shape of the columnar structures 130.

In the present embodiment, the area of the second end surface S2 of the columnar structures 130 is less than the display pixels of the display device (not shown) disposed corresponding to the optical film 100 with touch function. Therefore, when a display unit and the optical film 100 with touch function are assembled, a process of precise alignment can be omitted. However, in some embodiments, the area of the second end surface S2 can also be equal to the area of each of the pixels to achieve greater light use efficiency, and the disclosure is not limited thereto.

Moreover, in the present embodiment, the area of the second end surface S2 is greater than or equal to the area of the first end surface S1. The ratio of the area of the first end surface S1 to the area of the second end surface S2 is greater than or equal to 0.5, and less than or equal to 1. However, in some embodiments, the area of the first end surface S1 can also be greater than or equal to the area of the second end surface S2, and the ratio of the area of the second end surface S2 to the area of the first end surface S1 is greater than or equal to 0.5, and less than or equal to 1. The columnar structures 130 of the area ratio of the first end surface S1 and the second end surface S2 can be formed according to different light guide requirements, and the disclosure is not limited thereto.

Please refer further to FIG. 1B. In the present embodiment, the filter layer 140 of the optical film with touch function includes a first filter region 142, a second filter region 144, and a third filter region 146. The reflective layer 150 includes a first reflective region 152, a second reflective region 154, and a third reflective region 156. A vertical projection of the first reflective region 152 on the carrying surface CS falls within the range of a vertical projection of the first filter region 142 on the carrying surface CS. A vertical projection of the second reflective region 154 on the carrying surface CS falls within the range of a vertical projection of the second filter region 144 on the carrying surface CS. Moreover, a vertical projection of the third reflective region 156 on the carrying surface CS falls within the range of a vertical projection of the third filter region 146 on the carrying surface CS.

Figure 1C:
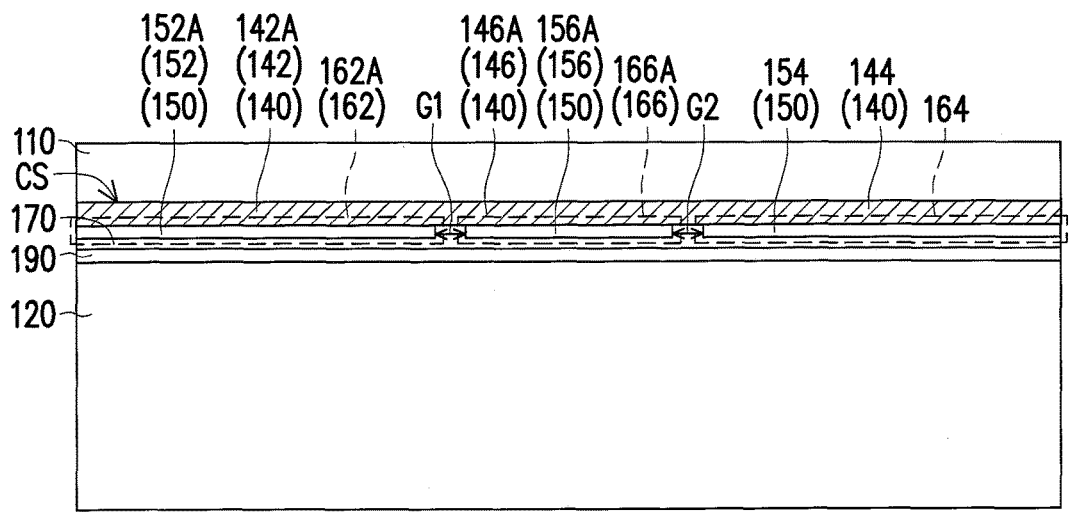
FIG. 1C is a cross-sectional view of the optical film with touch function of the embodiment of FIG. 1A along line II-II.
Figure 1D:
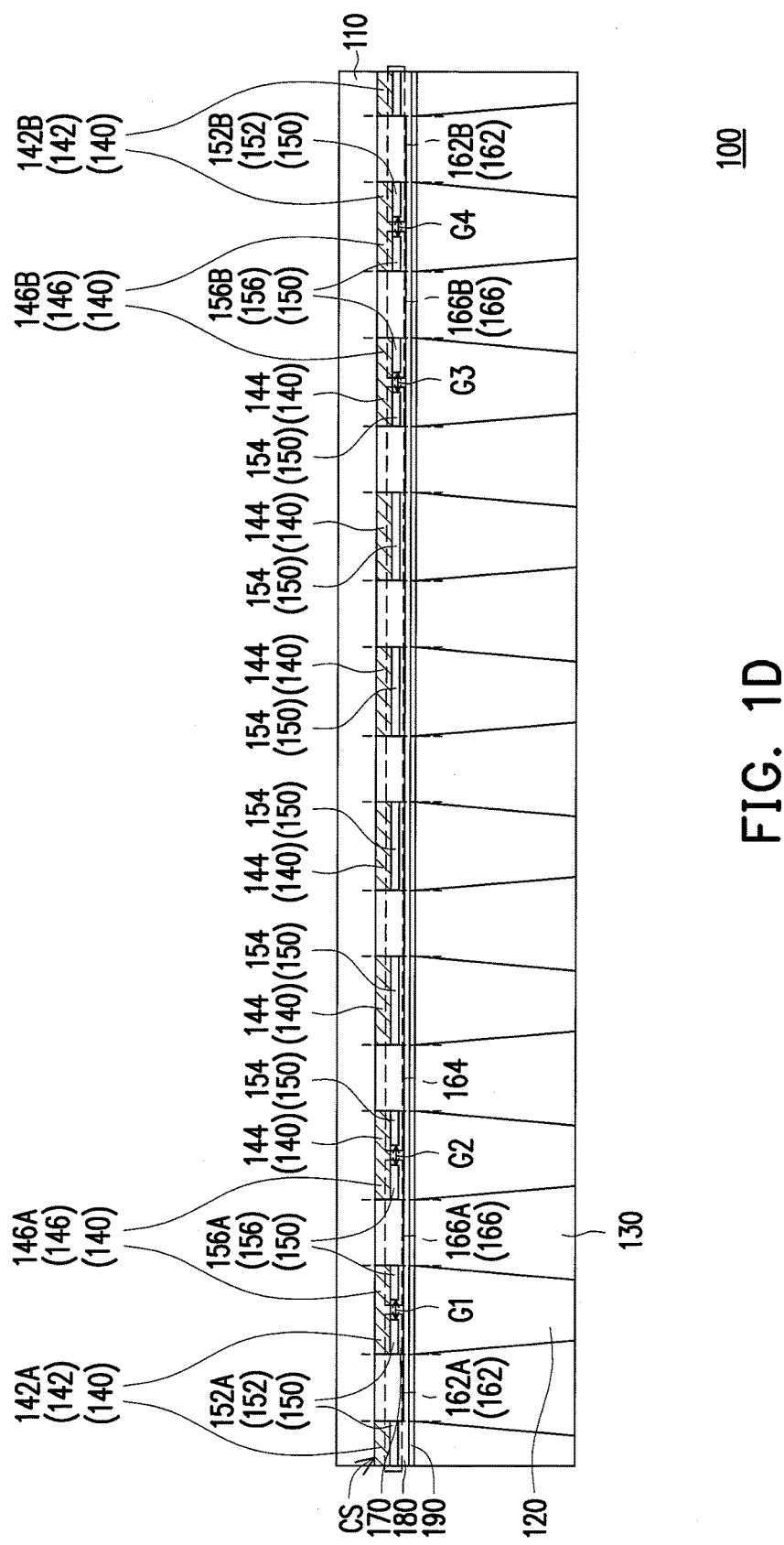
FIG. 1D is a cross-sectional view of the optical film with touch function of the embodiment of FIG. 1A along line III-III.

FIG. 1D is a cross-sectional view of the optical film with touch function of the embodiment of FIG. 1A along line III-III. Please refer to both FIG. 1A and FIG. 1D. In the present embodiment, the first filter region 142 includes a plurality of first sub-filter regions 142A and 142B. The first sub-filter regions 142A and 142B are separated from each other. The second filter region 144 is disposed between two adjacent first sub-filter regions 142A and 142B. The first reflective region 152 in a direction from the first sub-filter regions 142A and perpendicular to the carrying surface CS is defined as a first sub-reflective region 152A, and the first reflective region 152 in a direction from the first sub-filter regions 142B and perpendicular to the carrying surface CS is defined as a first sub-reflective region 152B. Moreover, in the present embodiment, the third filter region 146 includes a plurality of third sub-filter regions 146A and 146B. The third sub-filter region 146A are disposed between the first sub-filter regions 142A and the second filter region 144, and the third sub-filter regions 146B are disposed between the first sub-filter regions 142B and the second filter region 144. The third reflective region 156 in a direction from the third sub-filter region 146A and perpendicular to the carrying surface CS is defined as a third sub-reflective region 156A, and the third reflective region 156 in a direction from the third sub-filter region 146B and perpendicular to the carrying surface CS is defined as a third sub-reflective region 156B.

In the present embodiment, the first sub-electrode region 162A shown in FIG. 1A includes the first sub-reflective region 152A, and the first sub-electrode region 162B includes the first sub-reflective region 152B. Moreover, the second electrode region 164 includes the second reflective region 154. Moreover, the third sub-electrode region 166A includes the third sub-reflective region 156A, and the third sub-electrode region 166B includes the third sub-reflective region 156B.

FIG. 1C is a cross-sectional view of the optical film with touch function of the embodiment of FIG. 1A along line II-II. Please refer to FIG. 1B, FIG. 1C, and FIG. 1D. In the present embodiment, the optical film 100 with touch function further includes an insulating layer 170 and a connecting layer 180 (as shown in FIG. 1D). The insulating layer 170 is disposed between the reflective layer 150 and the material layer 120. The insulating layer 170 is at least disposed between the first sub-reflective region 152A and the material layer 120, between the first sub-reflective region 152B and the material layer 120, between the second reflective region 154 and the material layer 120, between the third sub-reflective region 156A and the material layer 120, and between the third sub-reflective region 156B and the material layer 120. Moreover, the insulating layer 170 connects the first sub-reflective region 152A and the second reflective region 154, and connects the first sub-reflective region 152B and the second reflective region 154. In the present embodiment, the insulating layer 170 is not electrically conductive. Therefore, the first sub-reflective region 152A and the second reflective region 154 cannot achieve electrical connection via the insulating layer 170, and the first sub-reflective region 152B and the second reflective region 154 cannot achieve electrical connection via the insulating layer 170. The material of the insulating layer 170 of the present embodiment is, for instance, a light-transmitting material which is electrically insulating, and the material of the reflective layer 150 is a conductive material capable of reflecting light, such as a metal. In the present embodiment, a portion of the display image beams of the display device (not shown) cannot be transmitted in the columnar structures 130 and emitted at the first end surfaces S1. The display image beams are, for instance, emitted from the surface of a side of the material layer 120 adjacent to the carrying surface CS. The reflective layer 150 can reflect the display image beams such that the display image beams have a chance to enter the columnar structures 130 and be emitted from the first end surfaces S1. As a result, the light extraction efficiency of the optical film 100 with touch function is good.

Moreover, in the present embodiment, the connecting layer 180 is disposed between the insulating layer 170 and the material layer 120. The connecting layer 180 connects the first sub-reflective region 152A and the first sub-reflective region 152B. The connecting layer 180 is electrically conductive. Therefore, the first sub-reflective region 152A and the first sub-reflective region 152B can achieve electrical connection via the connecting layer 180. In the present embodiment, the reflective layer of the optical film 100 with touch function forms a plurality of sensing electrode regions, and the sensing electrode regions are electrically insulated from one another. The first reflective region 152 is defined as a sensing electrode region and the second reflective region 154 is defined as another sensing electrode region. The sensing electrode region defined by the first reflective region 152 (first sub-reflective regions 152A and 152B) corresponding to the first electrode region 162 (first sub-electrode regions 162A and 162B) is used as one of the driving electrode and the sensing electrode in capacitive touch, and the sensing electrode region defined by the second reflective region 154 corresponding to the second electrode region 164 is used as the other one of the driving electrode and the sensing electrode in capacitive touch.

In the present embodiment, when the user touches, for instance, another side surface of the substrate 110 opposite to the carrying surface CS using a finger, capacitance change occurs between the first reflective region 152 and the second reflective region 154 closer to the finger of the user. By sensing the capacitance change between the first reflective region 152 and the second reflective region 154, the location of the finger of the user on the optical film 100 with touch function can be known.

Moreover, in the present embodiment, the third reflective region 156 (third sub-reflective regions 156A and 156B) corresponding to the third electrode region 166 (third sub-electrode regions 166A and 166B) is used as a dummy electrode disposed between the driving electrode and the sensing electrode. In the present embodiment, the first sub-reflective region 152A does not become electrically connected to the second reflective region 154 via the third sub-reflective region 156A, and the first sub-reflective region 152B does not become electrically connected to the second reflective region 154 via the third sub-reflective region 156B.

In the present embodiment, the gap G1 exists between the third sub-reflective region 156A and the first sub-reflective region 152A, and the gap G2 exists between the third sub-reflective region 156A and the second reflective region 154. Moreover, the gap G3 exists between the third sub-reflective region 156B and the second reflective region 152, and the gap G4 exists between the third sub-reflective region 156B and the first sub-reflective region 152B. In the present embodiment, the third reflective region 156 is not electrically connected to the first reflective region 152, and is also not electrically connected to the second reflective region 154. Moreover, the third reflective region 156 does not have touch sensing function. Since the optical film 100 with touch function includes the third reflective region 156, the light extraction efficiency of a portion of the optical film 100 with touch function corresponding to the location of the third reflective region 156 is good, and the effect thereof is similar to the locations of the first reflective region 152 and the second reflective region 154, such that the overall light extraction efficiency of the optical film 100 with touch function is good and light uniformity thereof is good.

In the present embodiment, the first electrode region 162 of the optical film 100 with touch function includes two first sub-electrode regions 162A and 162B, and the third electrode region 166 includes two third sub-electrode regions 166A and 166B. However, in some embodiments, the first electrode region of the optical film with touch function can also include more than two first sub-electrode regions, and the third electrode region can also include more than two third sub-electrode regions. Moreover, the second electrode region 164 can also include a plurality of second sub-electrode regions. In these embodiments, the first sub-electrode regions in the first electrode region are electrically connected to one another, and the second sub-electrode regions in the second electrode region are electrically connected to one another. Moreover, the first sub-electrode regions in the first electrode region are electrically insulated from the second sub-electrode regions in the second electrode region. The disclosure does not limit the quantity of the first sub-electrode regions, the second sub-electrode regions, and the third sub-electrode regions.

Please refer further to FIG. 1B, FIG. 1C, and FIG. 1D. In the present embodiment, the optical film 100 with touch function further includes a planar layer 190. The planar layer 190 is disposed between the connecting layer 180 and the material layer 120, and disposed between the insulating layer 170 and the material layer 120. The planar layer 190 covers the connecting layer 180 and the insulating layer 170, and provides a planar surface to form the material layer 120 and the columnar structures 130. In the present embodiment, the material of the planar layer 190 is a light-transmitting coating material or other types of light-transmitting materials. However, in other embodiments, the material of the planar layer can also be a material pervious to a portion of a wavelength range of light or a photoresist material, and the disclosure is not limited thereto.

In the present embodiment, a vertical projection of the first sub-reflective region 152A on the carrying surface CS falls within the range of a vertical projection of the first sub-filter region 142A on the carrying surface CS, and a vertical projection of the first sub-reflective region 152B on the carrying surface CS falls within the range of a vertical projection of the first sub-filter region 142B on the carrying surface CS. Moreover, a vertical projection of the second reflective region 154 falls within the range of a vertical projection of the second filter region 144 on the carrying surface CS. Moreover, a vertical projection of the third sub-reflective region 156A on the carrying surface CS falls within the range of a vertical projection of the third sub-filter region 146A on the carrying surface CS, and a vertical projection of the third sub-reflective region 156B on the carrying surface CS falls within the range of a vertical projection of the third sub-filter region 146B on the carrying surface CS. The areas of the first sub-reflective region 152A, the first sub-reflective region 152B, the second reflective region 154, the third sub-reflective region 156A, and the third sub-reflective region 156B are respectively less than or equal to the first sub-filter region 142A, the first sub-filter region 142B, the second filter region 144, the third sub-filter region 146A, and the third sub-filter region 146B. Moreover, the first sub-reflective region 152A, the first sub-reflective region 152B, the second reflective region 154, the third sub-reflective region 156A, and the third sub-reflective region 156B are respectively covered by the first sub-filter region 142A, the first sub-filter region 142B, the second filter region 144, the third sub-filter region 146A, and the third sub-filter region 146B.

Please refer to all of FIG. 1A, FIG. 1B, and FIG. 1D. In the present embodiment, the filter electrode layer has a plurality of openings. The filter layer 140 has a plurality of first openings 148, and the reflective layer 150 has a plurality of second openings 158. Each of the first openings 148 is connected to one of the second openings 158 to form an opening of the filter electrode layer of the present embodiment. In the present embodiment, the first sub-filter region 142A, the first sub-filter region 142B, the second filter region 144, the third sub-filter region 146A, and the third sub-filter region 146B have a plurality of first openings 148, and the first sub-reflective region 152A, the first sub-reflective region 152B, the second reflective region 154, the third sub-reflective region 156A, and the third sub-reflective region 156B have a plurality of second openings 158. Each of the first openings 148 is connected to one of the second openings 158. In the present embodiment, the openings of the filter electrode layer respectively expose the first end surfaces S1 of the columnar structures 130. A vertical projection of the first openings 148 on the carrying surface CS is overlapped with a vertical projection of the first end surfaces S1 of the columnar structures 130 on the carrying surface CS. Each of the columnar structures 130 is aligned with one of the first openings 148, and is also aligned with one of the second openings 158, and the area of the first openings 148 is equal to the area of the first end surfaces S1 of the columnar structures 130. However, in some embodiments, the area of the first openings 148 can be greater than or less than the area of the first end surfaces S1 of the columnar structures 130. Moreover, the insulating layer 170 of the optical film 100 with touch function of the present embodiment is placed in the first openings 148 and the second openings 158. However, in some embodiments, the insulating layer 170 can also not be disposed in the first openings 148 and the second openings 158, or the insulating layer 170 can also be disposed in a portion of the first openings 148 or a portion of the second openings 158, and the disclosure is not limited thereto.

In the present embodiment, the filter layer 140 is not electrically conductive, and the reflective layer 150 is electrically conductive. The first sub-filter regions 142A and 142B are connected to the second filter region 144. The third sub-filter regions 146A and 146B are connected to the first sub-filter regions 142A and 142B, and the third sub-filter regions 146A and 146B are also connected to the second filter region 144. In the present embodiment, the first sub-filter regions 142A and 142B, the second filter region 144, and the third sub-filter regions 146A and 146B in the filter layer 14 are integrally connected. However, in some embodiments, the first sub-filter regions 142A and 142B, the second filter region 144, and the third sub-filter regions 146A and 146B can also not be connected to one another or only portions thereof are connected to one another, and the disclosure is not limited thereto. Moreover, in the present embodiment, the filter layer 140 includes a black photoresist or a multilayer film filter layer suitable for absorbing visible light. However, in some embodiments, the filter layer can also include a single-layer film or a multilayer film suitable for absorbing light of a specific wavelength according to different needs, and the disclosure is not limited thereto. In the present embodiment, the display image beams of the display device (not shown) are transmitted in the columnar structures 130, and pass through the second openings 158 and the first openings 148 after being emitted from the first end surfaces S1 of the columnar structures 130, and are emitted from another surface of the substrate 110 opposite to the carrying surface CS. When the user views the optical film 100 with touch function at another side of the substrate 110 opposite to the carrying surface CS, the user can see the image frame via the plurality of first openings 148 and the plurality of second openings 158. In the present embodiment, since a portion of ambient light irradiated to the optical film 100 with touch function is absorbed by the filter layer 140, a small portion of the ambient light irradiated to the optical film 100 is transmitted to the eye of the user via the reflection of the optical film 100. Therefore, even if the display device is placed in an environment with high ambient light brightness, the user can still see the display image beams having high visual contrast via the optical film 100 with touch function.

Moreover, in the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 152 on the carrying surface CS falls within the range of a vertical projection of the first filter region 142 on the carrying surface CS, and a vertical projection of the second reflective region 154 on the carrying surface CS falls within the range of a vertical projection of the second filter region 144 on the carrying surface CS. Moreover, a vertical projection of the third reflective region 156 on the carrying surface CS falls within the range of a vertical projection of the third filter region 146 on the carrying surface CS. In other words, the first sub-reflective region 152A, the first sub-reflective region 152B, the second reflective region 154, the third sub-reflective region 156A, and the third sub-reflective region 156B are respectively covered by the first sub-filter region 142A, the first sub-filter region 142B, the second filter region 144, the third sub-filter region 146A, and the third sub-filter region 146B. In the present embodiment, when the user views the optical film 100 with touch function from another side of the substrate 110 opposite to the carrying surface CS, the user at least does not see the first sub-reflective region 152A, the first sub-reflective region 152B, the second reflective region 154, the third sub-reflective region 156A, and the third sub-reflective region 156B. When the user sees the image frame via the plurality of first openings 148 and the plurality of second openings 158, the user does not see the reflective layer 150. Therefore, the reflective layer 150 does not compromise the light uniformity of the optical film 100 with touch function, such that the light uniformity of the optical film 100 with touch function is good. Moreover, since the reflective layer 150 is covered by the filter layer 140, the reflective layer 150 does not need to be formed by a conductive film having light transmittance, and an opaque metal wire can be used, or an opaque metal layer can be used, such that the costs of the optical film 100 with touch function are lower. Moreover, the width of the reflective layer 150 can be maximized in the range covered by the filter layer 140 to provide better electrical performance to the optical film 100 with touch function. In other words, the electrical performance thereof can be increased without affecting the light uniformity of the optical film 100 with touch function.

Figure 2A:
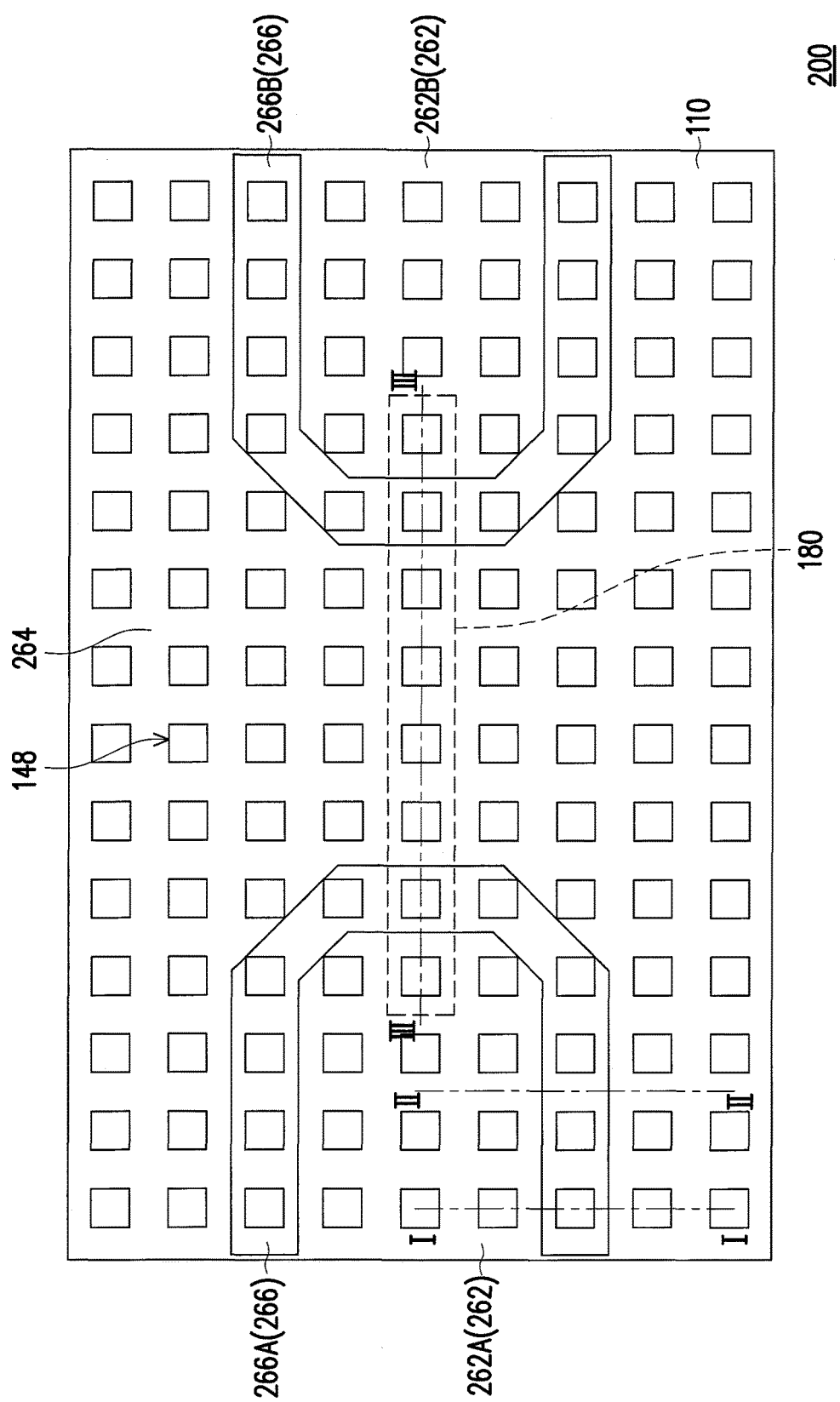
FIG. 2A is a top view of an optical film with touch function of another embodiment of the disclosure.
Figure 2B:
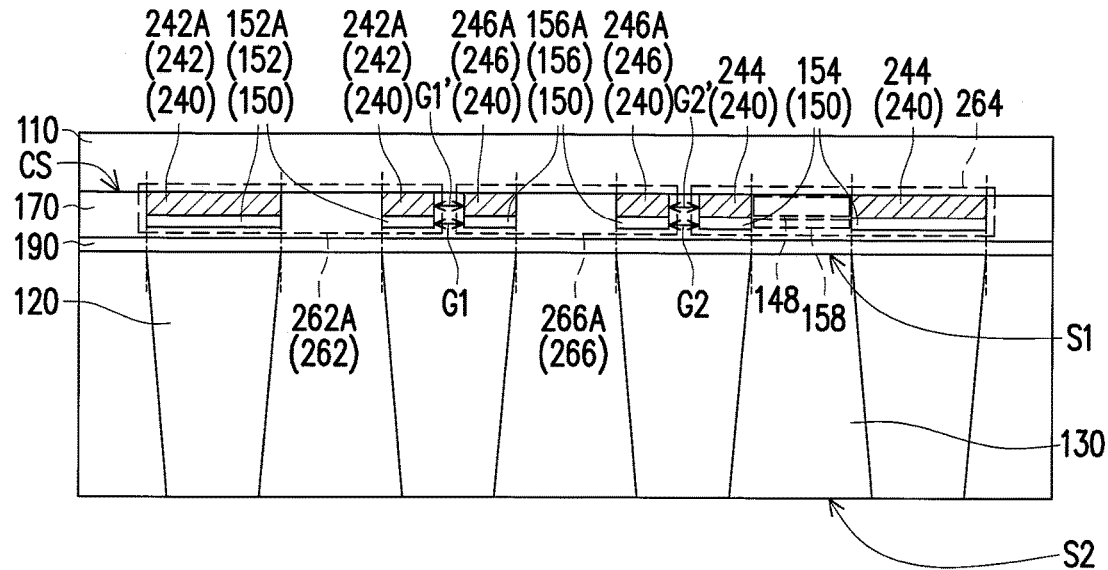
FIG. 2B is a cross-sectional view of the optical film with touch function of the embodiment of FIG. 2A along line I-I.
Figure 2C:
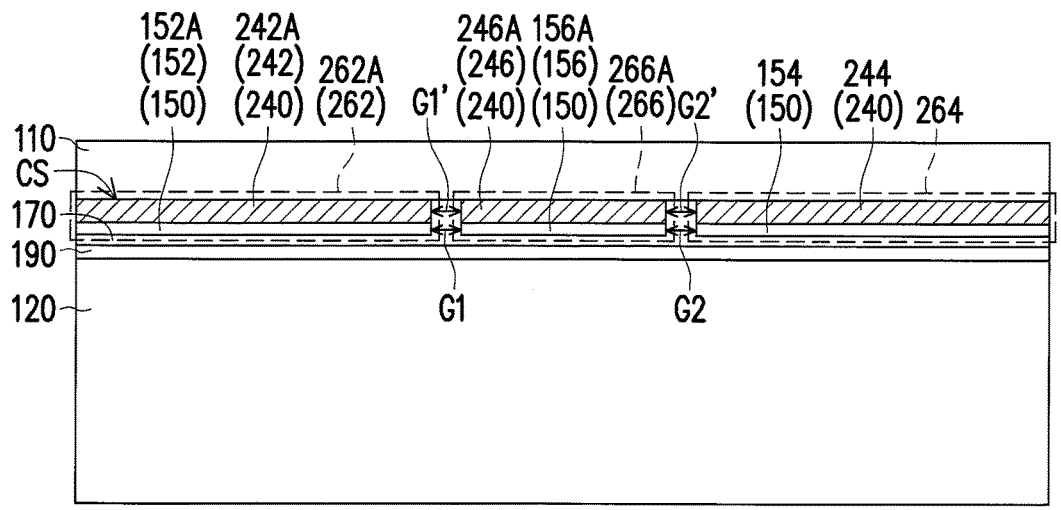
FIG. 2C is a cross-sectional view of the optical film with touch function of the embodiment of FIG. 2A along line II-II.
Figure 2D:
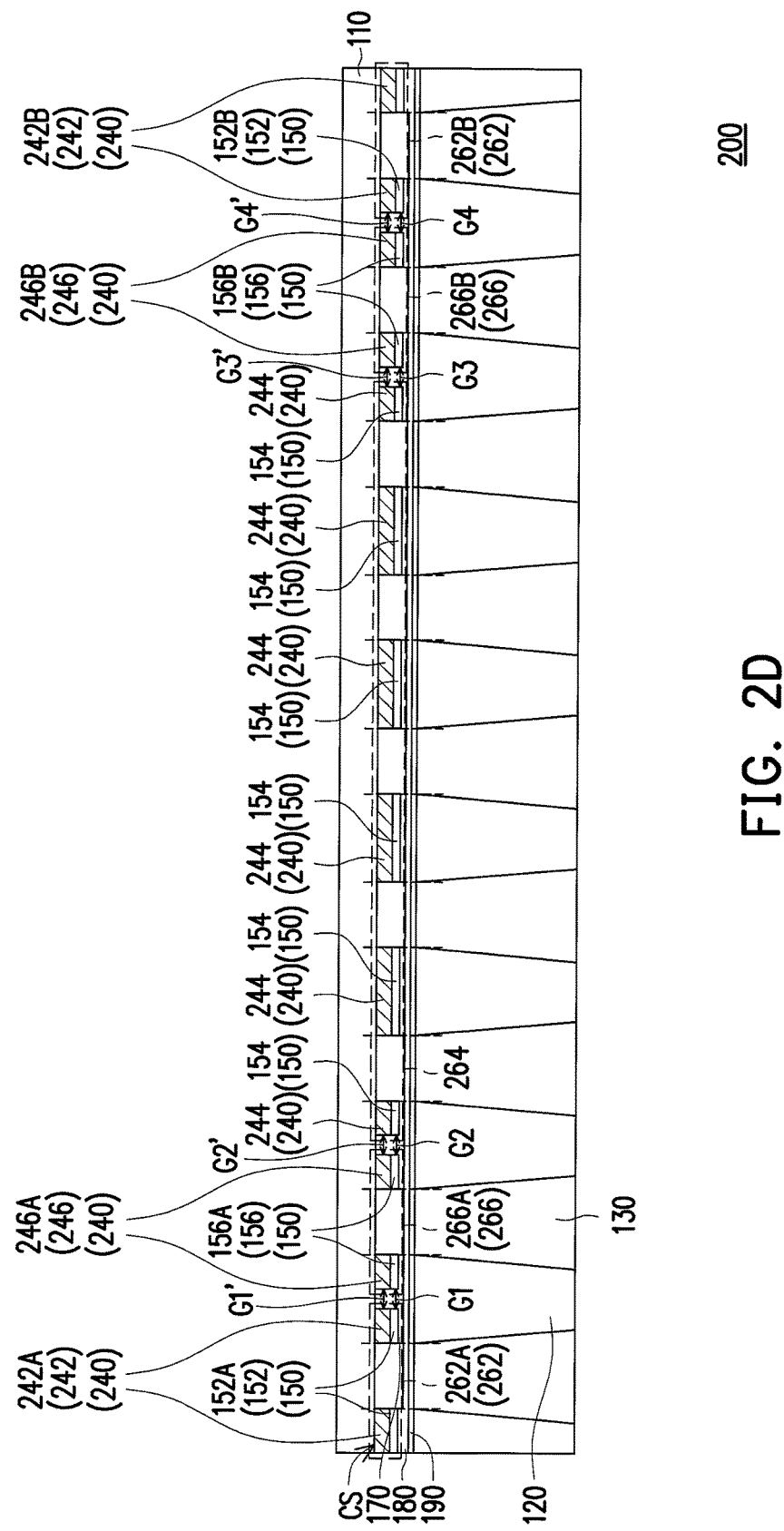
FIG. 2D is a cross-sectional view of the optical film with touch function of the embodiment of FIG. 2A along line III-III.

FIG. 2A is a top view of an optical film with touch function of another embodiment of the disclosure, FIG. 2B is a cross-sectional view of the optical film with touch function of the embodiment of FIG. 2A along line I-I, FIG. 2C is a cross-sectional view of the optical film with touch function of the embodiment of FIG. 2A along line II-II, and FIG. 2D is a cross-sectional view of the optical film with touch function of the embodiment of FIG. 2A along line III-III. Please refer to all of FIG. 2A to FIG. 2D. In the present embodiment, an optical film 200 with touch function is similar to the optical film 100 with touch function of the embodiment of FIG. 1A. The components and relevant descriptions of the optical film 200 with touch function are as presented for the relevant descriptions of the optical film 100 with touch function, and are therefore not repeated herein. The difference between the optical film 200 with touch function and the optical film 100 with touch function is that, a filter layer 240 and the reflective layer 150 in the optical film 200 with touch function are electrically conductive. The filter layer 240 includes a first filter region 242 (first sub-filter regions 242A and 242B), a second filter region 244, and a third filter region 246 (third sub-filter regions 246A and 246B).

In the present embodiment, the first electrode region 262 includes first sub-electrode regions 262A and 262B, and the third electrode region 266 includes third sub-electrode regions 266A and 266B. The first sub-electrode region 262A includes the first sub-filter region 242A and the first sub-reflective region 152A, the first sub-electrode region 262B includes the first sub-filter region 242B and the first sub-reflective region 152B, the second electrode region 264 includes the second filter region 244 and the second reflective region 154, the third sub-electrode region 266A includes the third sub-filter region 246A and the third sub-reflective region 156A, and the third sub-electrode region 266B includes the third sub-filter region 246B and the third sub-reflective region 156B.

In the present embodiment, the filter electrode layer includes a plurality of sensing electrode regions, and the sensing electrode regions are electrically insulated from one another. The first filter region 242 and the first reflective region 152 are defined as a sensing electrode region, and the second filter region 244 and the second reflective region 154 are defined as another sensing electrode region. The sensing electrode region defined by the first filter region 242 (first sub-filter regions 242A and 242B) and the first reflective region 152 (first sub-reflective regions 152A and 152B) is used as one of the driving electrode and the sensing electrode in capacitive touch, and the sensing electrode region defined by the second filter region 244 and the second reflective region 154 is used as the other one of the driving electrode and the sensing electrode in capacitive touch. Moreover, the third filter region 246 (third sub-filter regions 246A and 246B) and the third reflective region 156 (third sub-reflective regions 156A and 156B) are used as dummy electrodes disposed between the driving electrode and the sensing electrode. In the present embodiment, the gap G1 exists between the third sub-reflective region 156A and the first sub-reflective region 152A, and a gap G1' exists between the third sub-filter region 246A and the first sub-filter region 242A. The gap G2 exists between the third sub-reflective region 156A and the second reflective region 154, and a gap G2' exists between the third sub-filter region 246A and the second filter region 244. Moreover, the gap G3 exists between the third sub-reflective region 156B and the second reflective region 154, and a gap G3' exists between the third sub-filter region 246B and the second filter region 244. Moreover, the gap G4 exists between the third sub-reflective region 156B and the first sub-reflective region 152B, and a gap G4' exists between the third sub-filter region 246B and the first sub-filter region 242B. In the present embodiment, the first sub-reflective region 152A does not become electrically connected to the second reflective region 154 via the third sub-reflective region 156A or the filter layer 240, and the first sub-reflective region 152B does not become electrically connected to the second reflective region 154 via the third sub-reflective region 156B or the filter layer 240.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 152 on the carrying surface CS falls within the range of a vertical projection of the first filter region 242 on the carrying surface CS, and a vertical projection of the second reflective region 154 on the carrying surface CS falls within the range of a vertical projection of the second filter region 244 on the carrying surface CS. Moreover, a vertical projection of the third reflective region 156 on the carrying surface CS falls within the range of a vertical projection of the third filter region 246 on the carrying surface CS. When the user views the optical film 200 with touch function from another side of the substrate 110 opposite to the carrying surface CS, the user at least does not see the first sub-reflective region 152A, the first sub-reflective region 152B, the second reflective region 154, the third sub-reflective region 156A, and the third sub-reflective region 156B. When the user sees the image frame via the plurality of first openings 148 and the plurality of second openings 158, the user does not see the reflective layer 150. Therefore, the reflective layer 150 does not compromise the light uniformity of the optical film 200 with touch function, such that the light uniformity of the optical film 200 with touch function of the present embodiment is good and costs are lower, as is the case of the optical film 100 with touch function of the embodiment of FIG. 1A. Moreover, the electrical performance of the optical film 200 with touch function can be increased without affecting light uniformity.

Figure 3A:
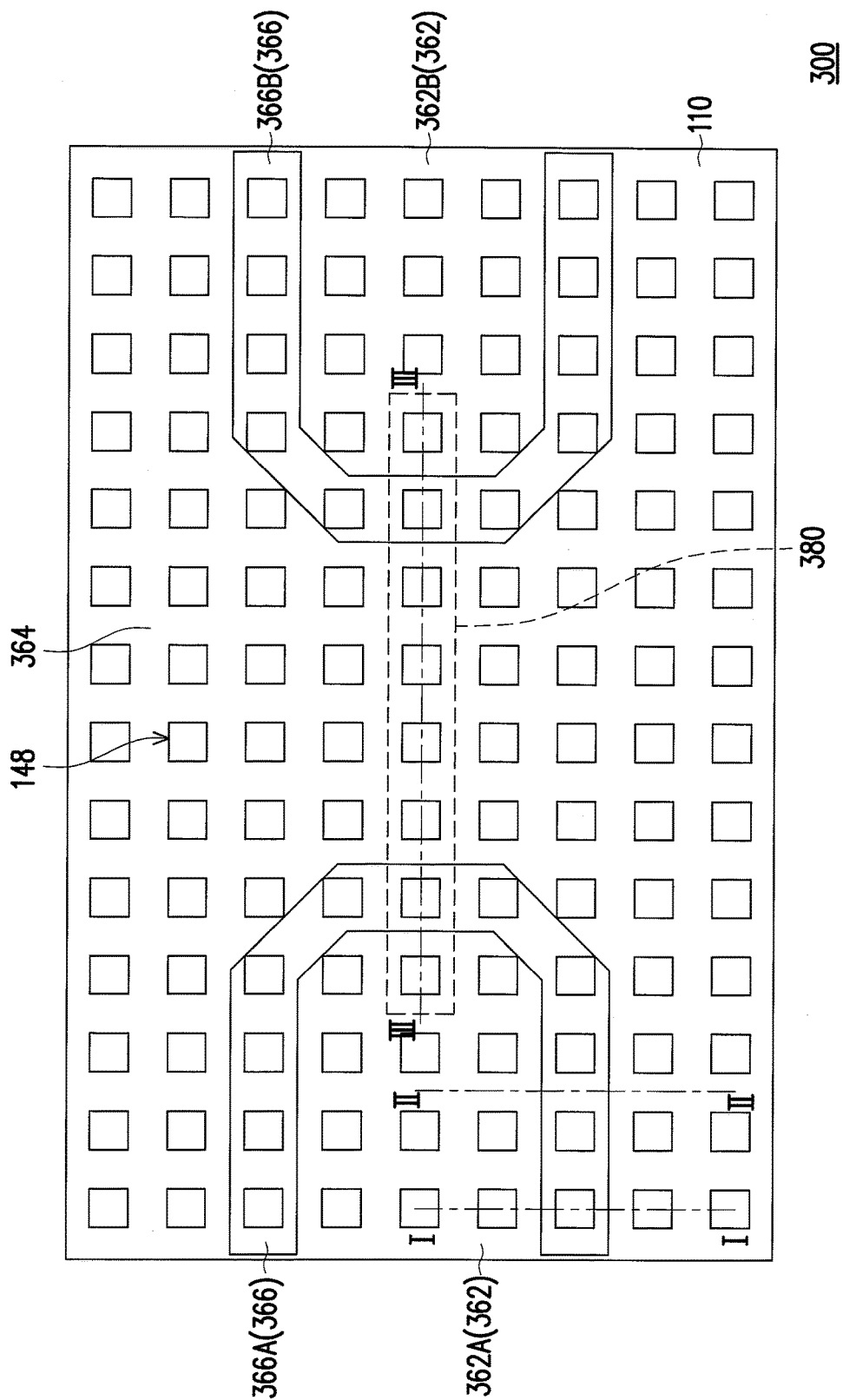
FIG. 3A is a top view of an optical film with touch function of yet another embodiment of the disclosure.
Figure 3B:
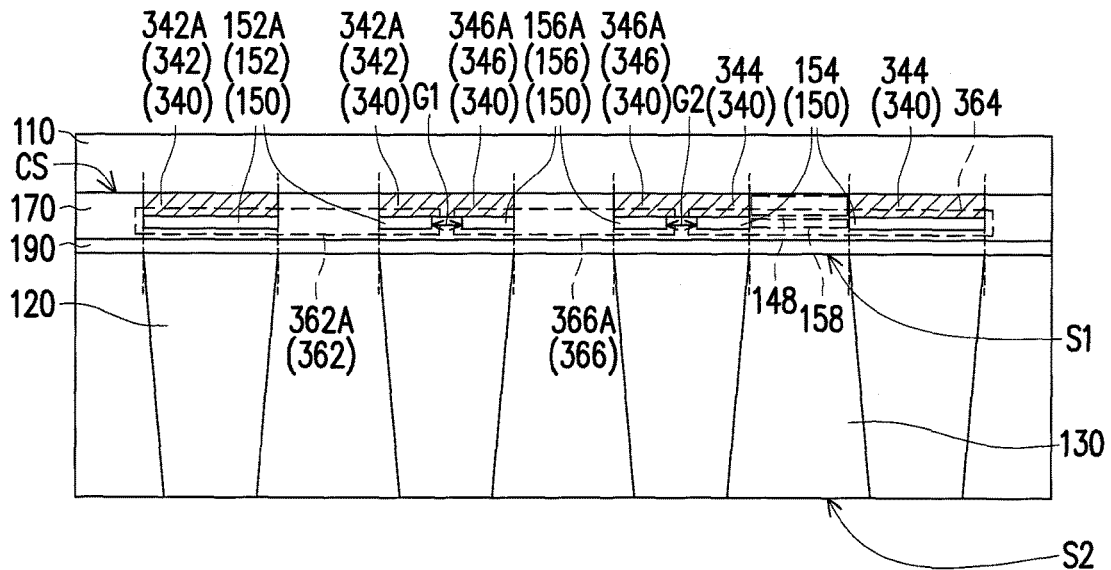
FIG. 3B is a cross-sectional view of the optical film with touch function of the embodiment of FIG. 3A along line I-I.
Figure 3C:
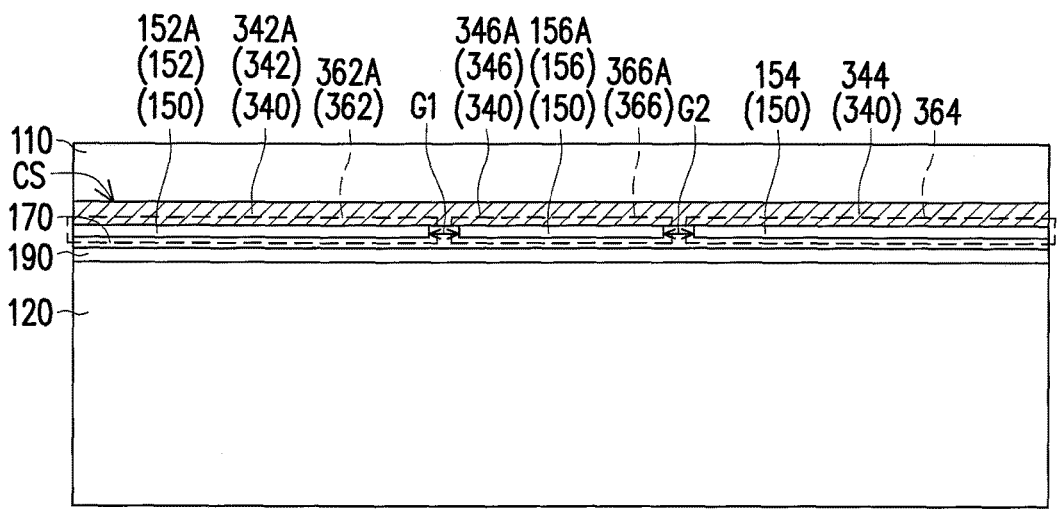
FIG. 3C is a cross-sectional view of the optical film with touch function of the embodiment of FIG. 3A along line II-II.
Figure 3D:
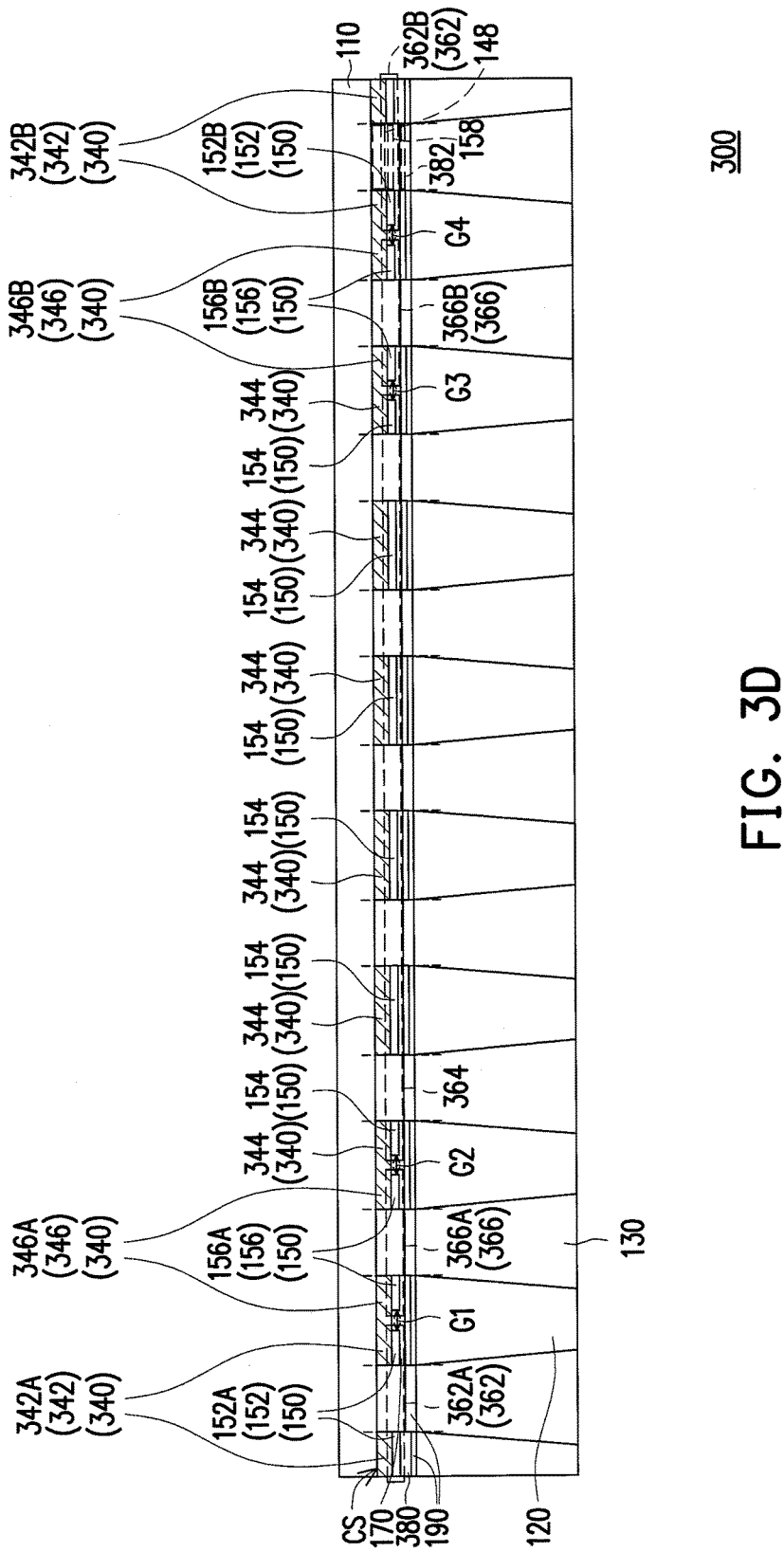
FIG. 3D is a cross-sectional view of the optical film with touch function of the embodiment of FIG. 3A along line III-III.

FIG. 3A is a top view of an optical film with touch function of yet another embodiment of the disclosure, FIG. 3B is a cross-sectional view of the optical film with touch function of the embodiment of FIG. 3A along line I-I, FIG. 3C is a cross-sectional view of the optical film with touch function of the embodiment of FIG. 3A along line II-II, and FIG. 3D is a cross-sectional view of the optical film with touch function of the embodiment of FIG. 3A along line III-III. Please refer to all of FIG. 3A to FIG. 3D. In the present embodiment, an optical film 300 with touch function is similar to the optical film 100 with touch function of the embodiment of FIG. 1A. The components and relevant descriptions of the optical film 300 with touch function are as presented for the relevant descriptions of the optical film 100 with touch function, and are therefore not repeated herein. The difference between the optical film 300 with touch function and the optical film 100 with touch function is that, a connecting layer 380 of the optical film 300 with touch function has a plurality of third openings 382 (as shown in FIG. 3D). Each of the third openings 382 is connected to one of the first openings 148 to form an opening of the filter electrode layer of the present embodiment. In the present embodiment, a vertical projection of the first openings 148 connected to the third openings 382 on the carrying surface CS falls within the range of a vertical projection of the third openings 382 on the carrying surface CS. Each of the third openings 382 is aligned with one of the first openings 148, and is also aligned with one of the second openings 158, and the area of the first openings 148 is equal to the area of the third opening 382. However, in some embodiments, the area of the first openings 148 can be greater than or less than the area of the third openings 382, and the disclosure is not limited thereto.

In the present embodiment, the filter layer 340 in the optical film 300 with touch function is not electrically conductive, and the reflective layer 150 is electrically conductive. The filter layer 340 includes a first filter region 342 (first sub-filter regions 342A and 342B), a second filter region 344, and a third filter region 346 (third sub-filter regions 346A and 346B).

In the present embodiment, the first electrode region 362 includes first sub-electrode regions 362A and 362B, and the third electrode region 366 includes third sub-electrode regions 366A and 366B. The first sub-electrode region 362A includes the first sub-reflective region 152A, the first sub-electrode region 362B includes the first sub-reflective region 152B, the second electrode region 364 includes the second reflective region 154, the third sub-electrode region 366A includes the third sub-reflective region 156A, and the third sub-electrode region 366B includes the third sub-reflective region 156B.

In the present embodiment, the filter electrode layer includes a plurality of sensing electrode regions, and the sensing electrode regions are electrically insulated from one another. The first reflective region 152 is defined as a sensing electrode region and the second reflective region 154 is defined as another sensing electrode region. The sensing electrode region defined by the first reflective region 152 (first sub-reflective regions 152A and 152B) is used as one of the driving electrode and the sensing electrode in capacitive touch, and the sensing electrode region defined by the second reflective region 154 is used as the other one of the driving electrode and the sensing electrode in capacitive touch. The third reflective region 156 (third sub-reflective regions 156A and 156B) is used as a dummy electrode disposed between the driving electrode and the sensing electrode. In the present embodiment, the first sub-reflective region 152A does not become electrically connected to the second reflective region 154 via the third sub-reflective region 156A, and the first sub-reflective region 152B does not become electrically connected to the second reflective region 154 via the third sub-reflective region 156B.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 152 on the carrying surface CS falls within the range of a vertical projection of the first filter region 342 on the carrying surface CS, and a vertical projection of the second reflective region 154 on the carrying surface CS falls within the range of a vertical projection of the second filter region 344 on the carrying surface CS. Moreover, a vertical projection of the third reflective region 156 on the carrying surface CS falls within the range of a vertical projection of the third filter region 346 on the carrying surface CS. When the user views the optical film 300 with touch function from another side of the substrate 110 opposite to the carrying surface CS, the user at least does not see the first sub-reflective region 152A, the first sub-reflective region 152B, the second reflective region 154, the third sub-reflective region 156A, and the third sub-reflective region 156B. When the user sees the image frame via the plurality of first openings 148 and the plurality of second openings 158, the user does not see the reflective layer 150. Therefore, the reflective layer 150 does not compromise the light uniformity of the optical film 300 with touch function, such that the light uniformity of the optical film 300 with touch function of the present embodiment is good and costs are lower, as is the case of the optical film 100 with touch function of the embodiment of FIG. 1A. Moreover, the electrical performance of the optical film 300 with touch function can be increased without affecting light uniformity. Moreover, since a vertical projection of the first openings 148 connected to the third openings 382 of the connecting layer 380 on the carrying surface CS falls within the range of a vertical projection of the third openings 382 on the carrying surface CS, in the present embodiment, the display image beams of the display device (not shown) used with the optical film 300 with touch function are transmitted in the columnar structures 130, and after the display image beams are emitted from the first end surfaces S1 of the columnar structures 130, a portion of the display image beams passing through the third openings 382 then pass through the second openings 158 and the first openings 148, and are emitted from another surface of the substrate 110 opposite to the carrying surface CS. Therefore, a portion of the display image beams can be emitted via the third openings 382, such that the light intensity of the optical film 300 with touch function of the present embodiment is increased, and the light uniformity thereof is good.

Figure 4A:
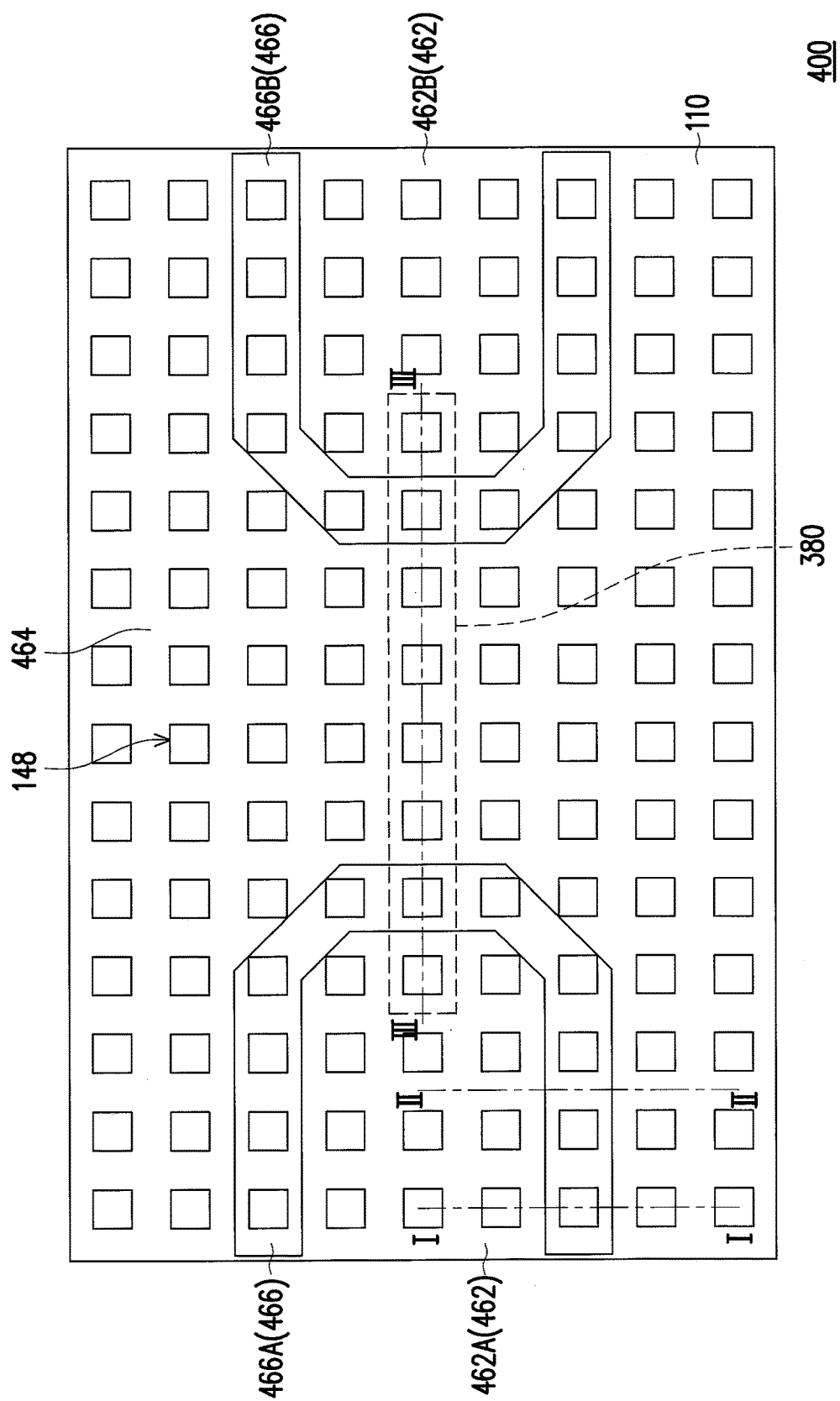
FIG. 4A is a top view of an optical film with touch function of still yet another embodiment of the disclosure.
Figure 4B:
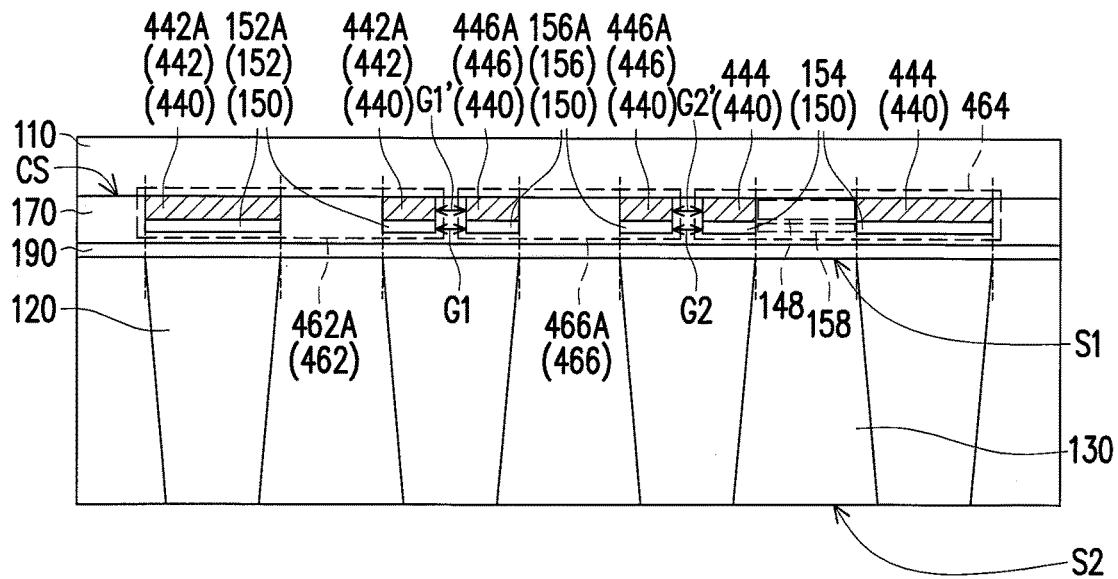
FIG. 4B is a cross-sectional view of the optical film with touch function of the embodiment of FIG. 4A along line I-I.
Figure 4C:
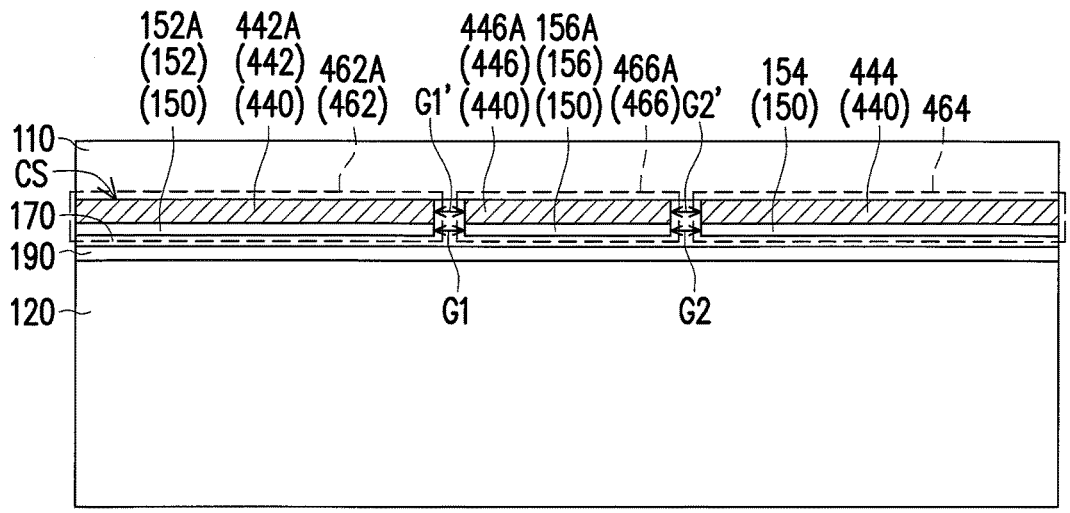
FIG. 4C is a cross-sectional view of the optical film with touch function of the embodiment of FIG. 4A along line II-II.
Figure 4D:
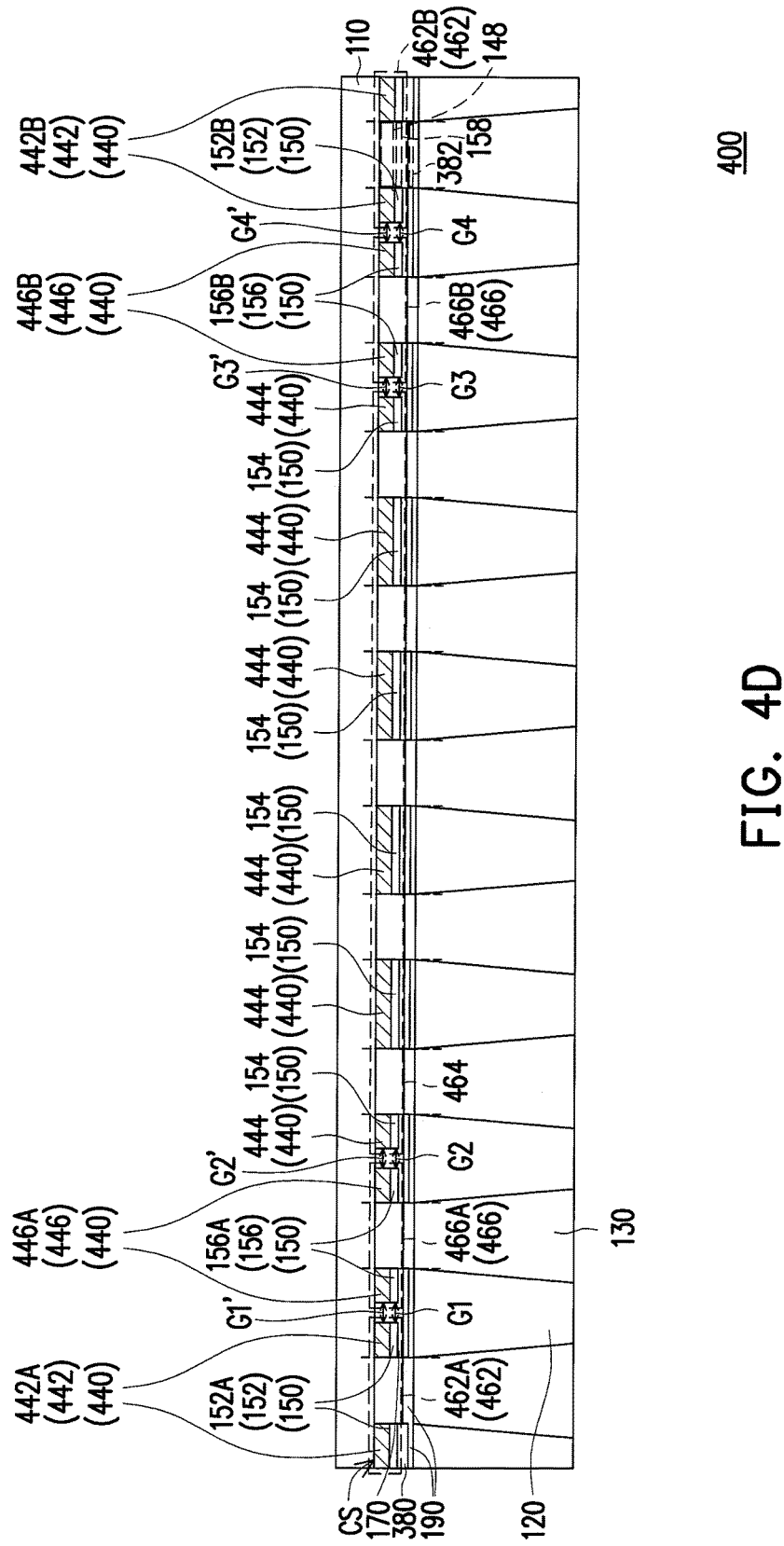
FIG. 4D is a cross-sectional view of the optical film with touch function of the embodiment of FIG. 4A along line III-III.

FIG. 4A is a top view of an optical film with touch function of still yet another embodiment of the disclosure, FIG. 4B is a cross-sectional view of the optical film with touch function of the embodiment of FIG. 4A along line I-I, FIG. 4C is a cross-sectional view of the optical film with touch function of the embodiment of FIG. 4A along line II-II, and FIG. 4D is a cross-sectional view of the optical film with touch function of the embodiment of FIG. 4A along line III-III. Please refer to all of FIG. 4A to FIG. 4D. In the present embodiment, an optical film 400 with touch function is similar to the optical film 200 with touch function of the embodiment of FIG. 2A. The components and relevant descriptions of the optical film 400 with touch function are as presented for the relevant descriptions of the optical film 200 with touch function, and are therefore not repeated herein. The difference between the optical film 400 with touch function and the optical film 200 with touch function is that, a connecting layer 380 of the optical film 400 with touch function has a plurality of third openings 382 (as shown in FIG. 4D). Each of the third openings 382 is connected to one of the first openings 148 to form an opening of the filter electrode layer of the present embodiment. In the present embodiment, a vertical projection of the first openings 148 connected to the third openings 382 on the carrying surface CS falls within the range of a vertical projection of the third openings 382 on the carrying surface CS. Each of the third openings 382 is aligned with one of the first openings 148, and is also aligned with one of the second openings 158, and the area of the first openings 148 is equal to the area of the third openings 382. However, in some embodiments, the area of the first openings 148 can be greater than or less than the area of the third openings 382, and the disclosure is not limited thereto.

In the present embodiment, the filter layer 440 and the reflective layer 150 in the optical film 400 with touch function are electrically conductive. The filter layer 440 includes a first filter region 442 (first sub-filter regions 442A and 442B), a second filter region 444, and a third filter region 446 (third sub-filter regions 446A and 446B). In the present embodiment, the first electrode region 462 includes first sub-electrode regions 462A and 462B, and the third electrode region 466 includes third sub-electrode regions 466A and 466B. The first sub-electrode region 462A includes the first sub-filter region 442A and the first sub-reflective region 152A, the first sub-electrode region 462B includes the first sub-filter region 442B and the first sub-reflective region 152B, the second electrode region 464 includes the second filter region 444 and the second reflective region 154, the third sub-electrode region 466A includes the third sub-filter region 446A and the third sub-reflective region 156A, and the third sub-electrode region 466B includes the third sub-filter region 446B and the third sub-reflective region 156B.

In the present embodiment, the filter electrode layer includes a plurality of sensing electrode regions, and the sensing electrode regions are electrically insulated from one another. The first filter region 442 and the first reflective region 152 are defined as a sensing electrode region, and the second filter region 444 and the second reflective region 154 are defined as another sensing electrode region. The sensing electrode region defined by the first filter region 442 (first sub-filter regions 442A and 442B) and the first reflective region 152 (first sub-reflective regions 152A and 152B) is used as one of the driving electrode and the sensing electrode in capacitive touch, and the sensing electrode region defined by the second filter region 444 and the second reflective region 154 is used as the other one of the driving electrode and the sensing electrode in capacitive touch. Moreover, the third filter region 446 (third sub-filter regions 446A and 446B) and the third reflective region 156 (third sub-reflective regions 156A and 156B) are used as dummy electrodes disposed between the driving electrode and the sensing electrode. In the present embodiment, the gap G1 exists between the third sub-reflective region 156A and the first sub-reflective region 152A, and the gap G1' exists between the third sub-filter region 446A and the first sub-filter region 442A. The gap G2 exists between the third sub-reflective region 156A and the second reflective region 154, and the gap G2' exists between the third sub-filter region 446A and the second filter region 444. Moreover, the gap G3 exists between the third sub-reflective region 156B and the second reflective region 154, and the gap G3' exists between the third sub-filter region 446B and the second filter region 444. Moreover, the gap G4 exists between the third sub-reflective region 156B and the first sub-reflective region 152B, and the gap G4' exists between the third sub-filter region 446B and the first sub-filter region 442B. In the present embodiment, the first sub-reflective region 152A does not become electrically connected to the second reflective region 154 via the third sub-reflective region 156A or the filter layer 440, and the first sub-reflective region 152B does not become electrically connected to the second reflective region 154 via the third sub-reflective region 156B or the filter layer 440.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 152 on the carrying surface CS falls within the range of a vertical projection of the first filter region 442 on the carrying surface CS, and a vertical projection of the second reflective region 154 on the carrying surface CS falls within the range of a vertical projection of the second filter region 444 on the carrying surface CS. Moreover, a vertical projection of the third reflective region 156 on the carrying surface CS falls within the range of a vertical projection of the third filter region 446 on the carrying surface CS. When the user views the optical film 400 with touch function from another side of the substrate 110 opposite to the carrying surface CS, the user at least does not see the first sub-reflective region 152A, the first sub-reflective region 152B, the second reflective region 154, the third sub-reflective region 156A, and the third sub-reflective region 156B. When the user sees the image frame via the plurality of first openings 148 and the plurality of second openings 158, the user does not see the reflective layer 150. Therefore, the reflective layer 150 does not compromise the light uniformity of the optical film 400 with touch function, such that the light uniformity of the optical film 400 with touch function of the present embodiment is good and costs are lower, as is the case of the optical film 100 with touch function of the embodiment of FIG. 1A. Moreover, the electrical performance of the optical film 400 with touch function can be increased without affecting light uniformity. Moreover, since a vertical projection of the first openings 148 connected to the third openings 382 of the connecting layer 380 on the carrying surface CS falls within the range of a vertical projection of the third openings 382 on the carrying surface CS, the light intensity of the optical film 400 with touch function of the present embodiment is increased and the light uniformity thereof is good, as is the case of the optical film 300 with touch function of the embodiment of FIG. 3A.

Figure 5A:
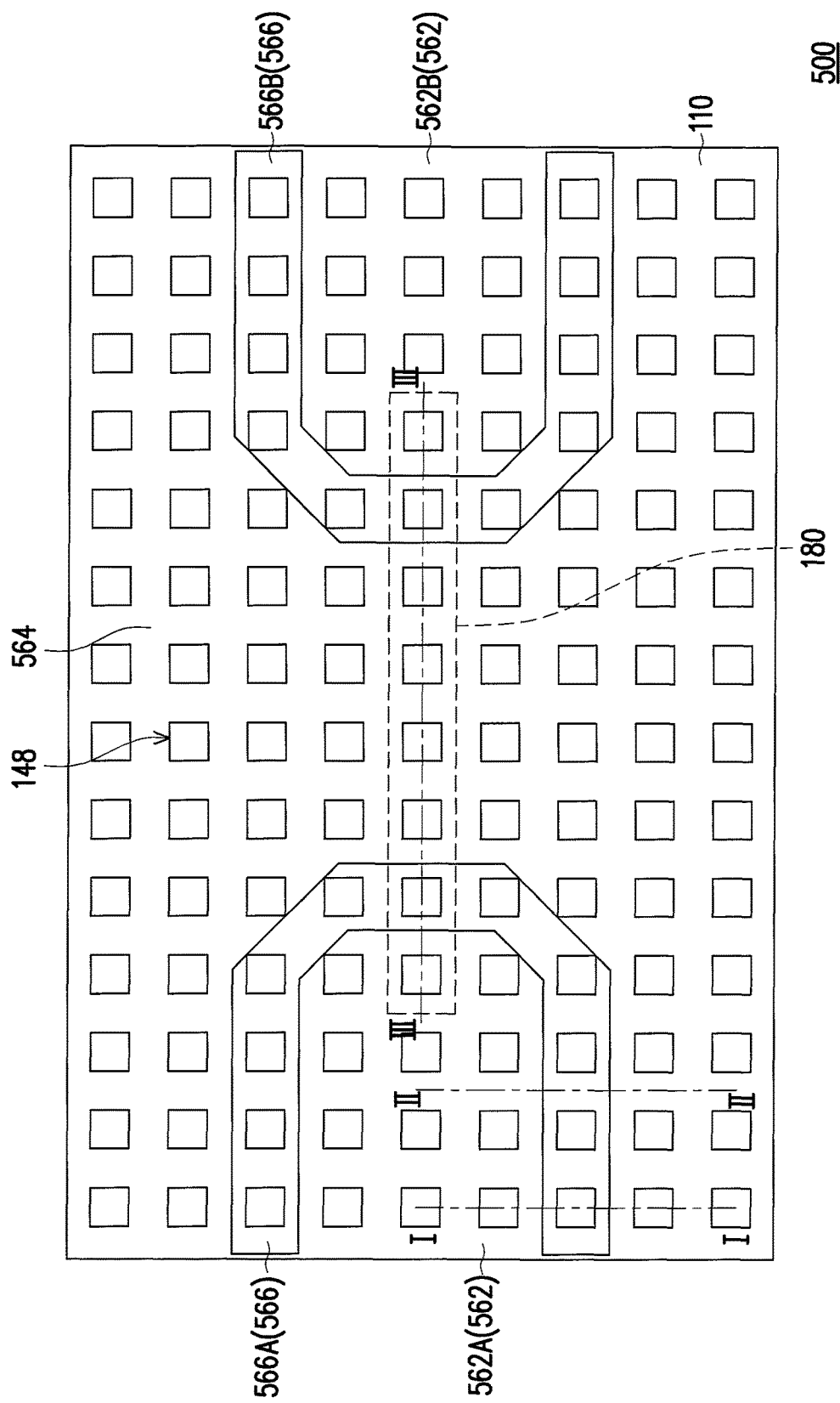
FIG. 5A is a top view of an optical film with touch function of still yet another embodiment of the disclosure.
Figure 5B:
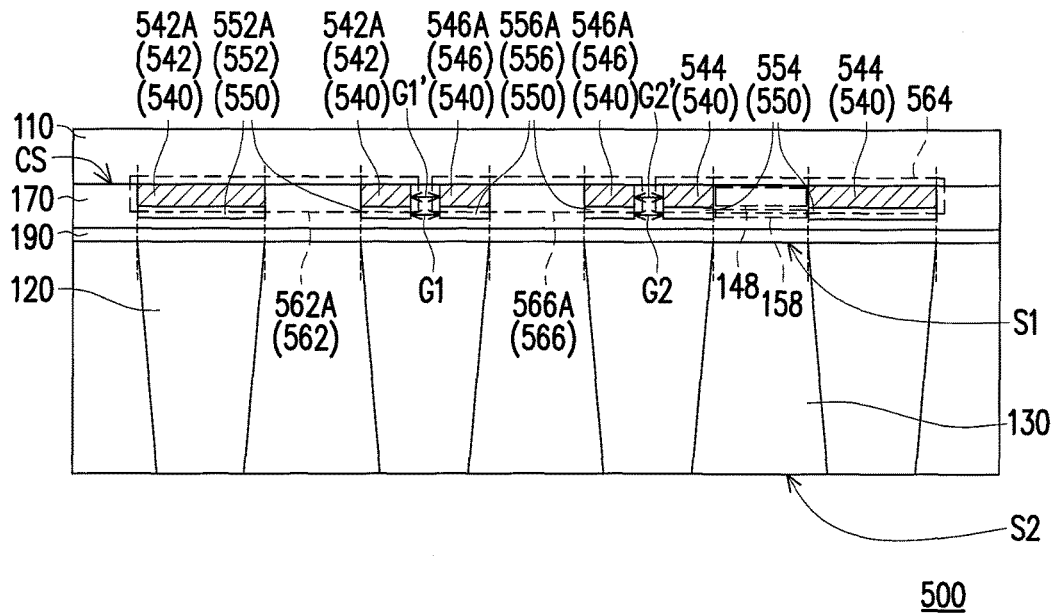
FIG. 5B is a cross-sectional view of the optical film with touch function of the embodiment of FIG. 5A along line I-I.
Figure 5C:
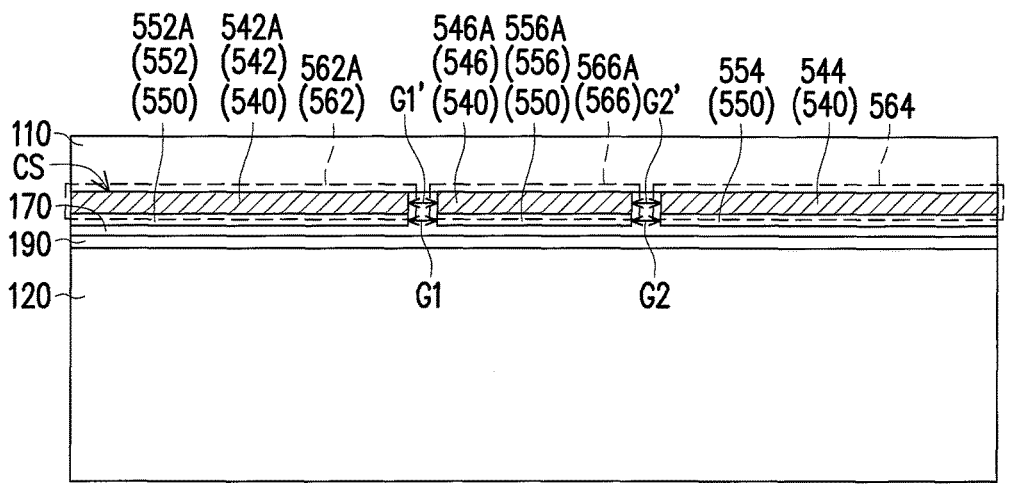
FIG. 5C is a cross-sectional view of the optical film with touch function of the embodiment of FIG. 5A along line II-II.
Figure 5D:
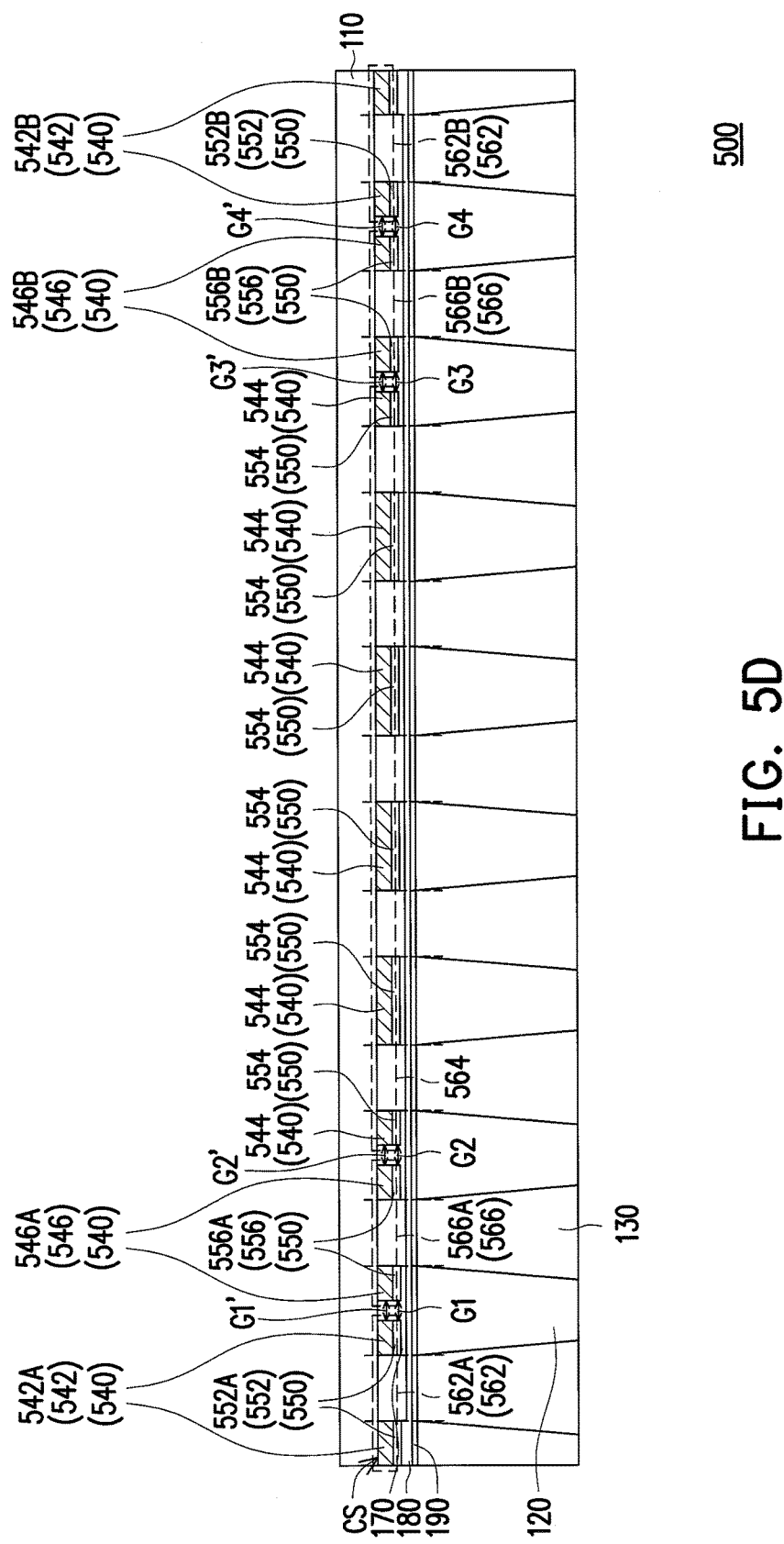
FIG. 5D is a cross-sectional view of the optical film with touch function of the embodiment of FIG. 5A along line III-III.

FIG. 5A is a top view of an optical film with touch function of still yet another embodiment of the disclosure, FIG. 5B is a cross-sectional view of the optical film with touch function of the embodiment of FIG. 5A along line I-I, FIG. 5C is a cross-sectional view of the optical film with touch function of the embodiment of FIG. 5A along line II-II, and FIG. 5D is a cross-sectional view of the optical film with touch function of the embodiment of FIG. 5A along line III-III. Please refer to all of FIG. 5A to FIG. 5D. In the present embodiment, an optical film 500 with touch function is similar to the optical film 200 with touch function of the embodiment of FIG. 2A. The components and relevant descriptions of the optical film 500 with touch function are as presented for the relevant descriptions of the optical film 200 with touch function, and are therefore not repeated herein. The difference between the optical film 500 with touch function and the optical film 200 with touch function is that, a reflective layer 550 of the optical film 500 with touch function is not electrically conductive. Moreover, the filter layer 540 of the optical film 500 with touch function is electrically conductive, and the first sub-filter regions 542A and 542B are electrically insulated from the second filter region 544.

In the present embodiment, the filter layer 540 includes a first filter region 542 (first sub-filter regions 542A and 542B), a second filter region 544, and a third filter region 546 (third sub-filter regions 546A and 546B). Moreover, the reflective layer 550 includes a first reflective region 552 (first sub-reflective regions 552A and 552B), a second reflective region 554, and a third reflective region 556 (third sub-reflective regions 556A and 556B). In the present embodiment, the first electrode region 562 includes first sub-electrode regions 562A and 562B, and the third electrode region 566 includes third sub-electrode regions 566A and 566B. The first sub-electrode region 562A includes the first sub-filter region 542A, the first sub-electrode region 562B includes the first sub-filter region 542B, the second electrode region 564 includes the second filter region 544, the third sub-electrode region 566A includes the third sub-filter region 546A, and the third sub-electrode region 566B includes the third sub-filter region 546B. Moreover, the optical film 500 with touch function includes the insulating layer 170 and the connecting layer 180. The insulating layer 170 is disposed between the filter layer 540 and the material layer 120, and the connecting layer 180 is disposed between the insulating layer 170 and the material layer 120. The insulating layer 170 connects the first sub-filter regions 542A and 542B and the second filter region 544, and the connecting layer 180 connects the first sub-filter regions 542A and 542B. In the present embodiment, the insulating layer 170 is not electrically conductive, and the connecting layer 180 is electrically conductive.

In the present embodiment, the filter electrode layer includes a plurality of sensing electrode regions, and the sensing electrode regions are electrically insulated from one another. The first filter region 542 is defined as a sensing electrode region and the second filter region 544 is defined as another sensing electrode region. The sensing electrode region defined by the first filter region 542 (first sub-filter regions 542A and 542B) is used as one of the driving electrode and the sensing electrode in capacitive touch, and the sensing electrode region defined by the second filter region 544 is used as the other one of the driving electrode and the sensing electrode in capacitive touch. Moreover, the third filter region 546 (third sub-filter regions 546A and 546B) is used as a dummy electrode disposed between the driving electrode and the sensing electrode.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 552 on the carrying surface CS falls within the range of a vertical projection of the first filter region 542 on the carrying surface CS, and a vertical projection of the second reflective region 554 on the carrying surface CS falls within the range of a vertical projection of the second filter region 544 on the carrying surface CS. Moreover, a vertical projection of the third reflective region 556 on the carrying surface CS falls within the range of a vertical projection of the third filter region 546 on the carrying surface CS. When the user views the optical film 500 with touch function from another side of the substrate 110 opposite to the carrying surface CS, the user at least does not see the first sub-reflective region 552A, the first sub-reflective region 552B, the second reflective region 554, the third sub-reflective region 556A, and the third sub-reflective region 556B. Specifically, when the user sees the image frame via the plurality of first openings 148 and the plurality of second openings 158, the user does not see the reflective layer 550. Therefore, the reflective layer 550 does not compromise the light uniformity of the optical film 500 with touch function, such that the light uniformity of the optical film 500 with touch function of the present embodiment is good and costs are lower, as is the case of the optical film 100 with touch function of the embodiment of FIG. 1A.

Figure 6A:
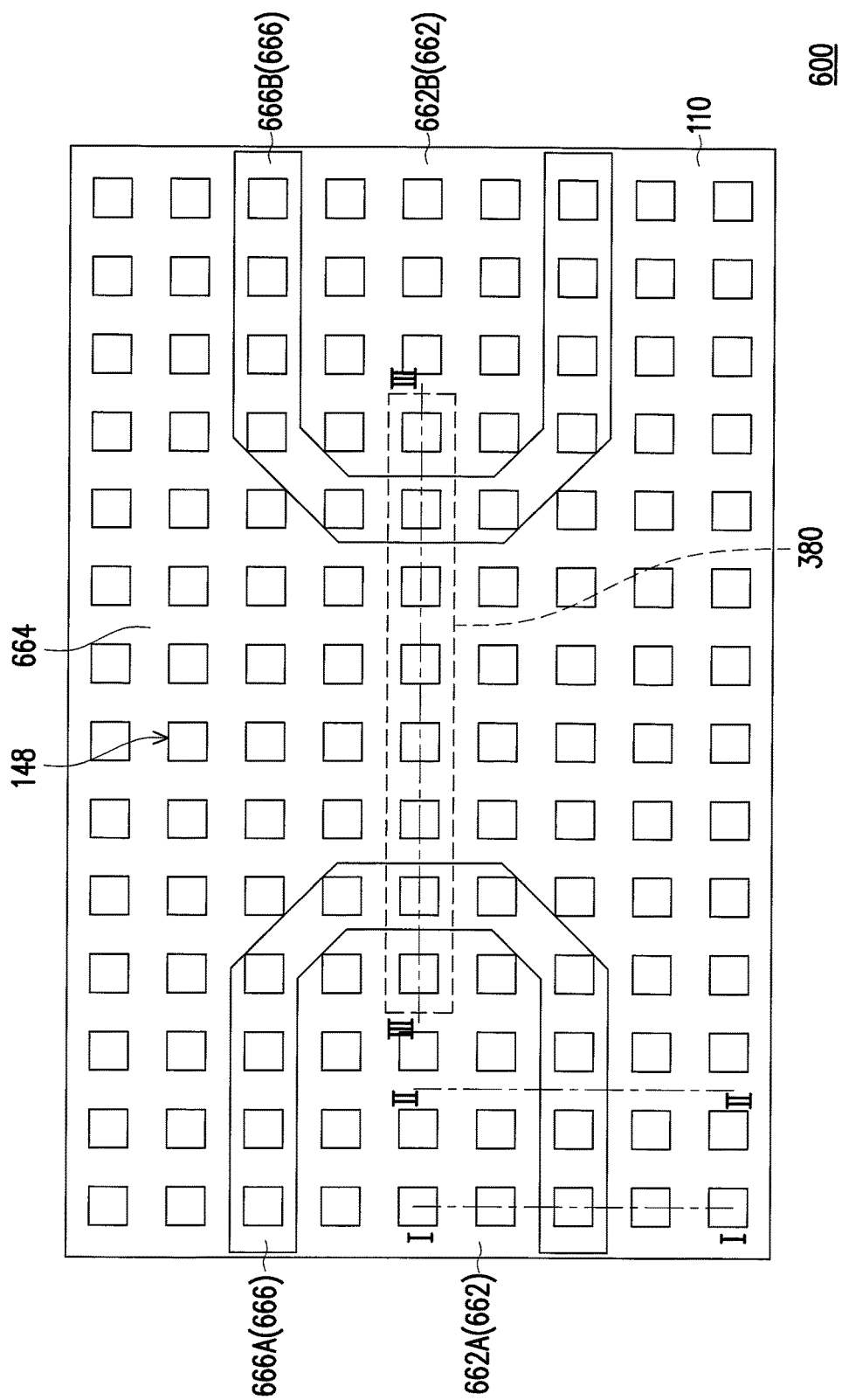
FIG. 6A is a top view of an optical film with touch function of still yet another embodiment of the disclosure.
Figure 6B:
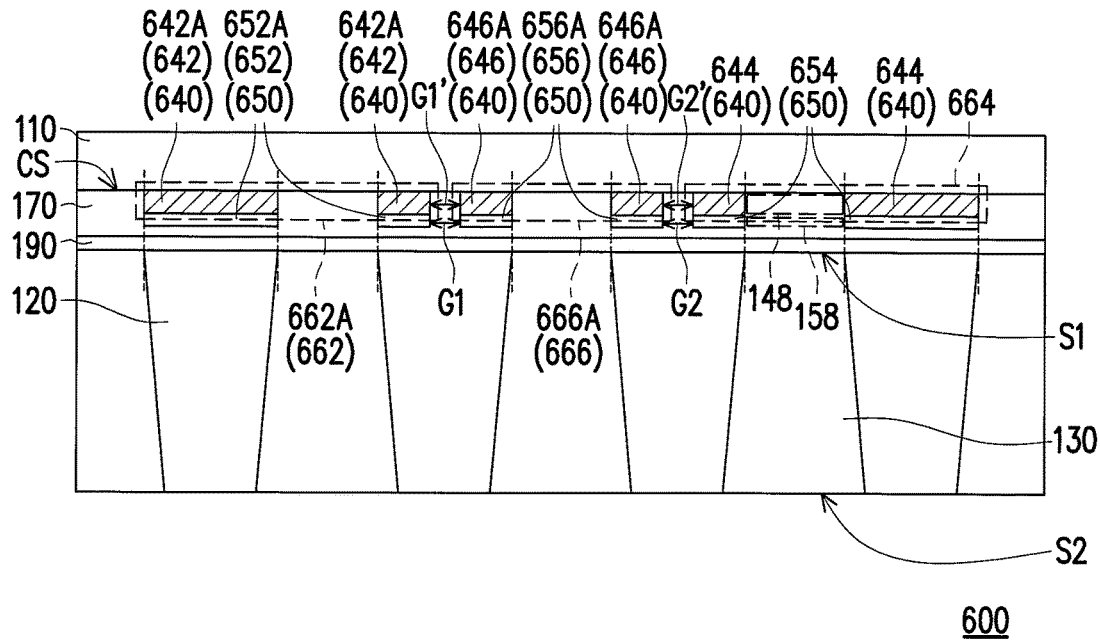
FIG. 6B is a cross-sectional view of the optical film with touch function of the embodiment of FIG. 6A along line I-I.
Figure 6C:
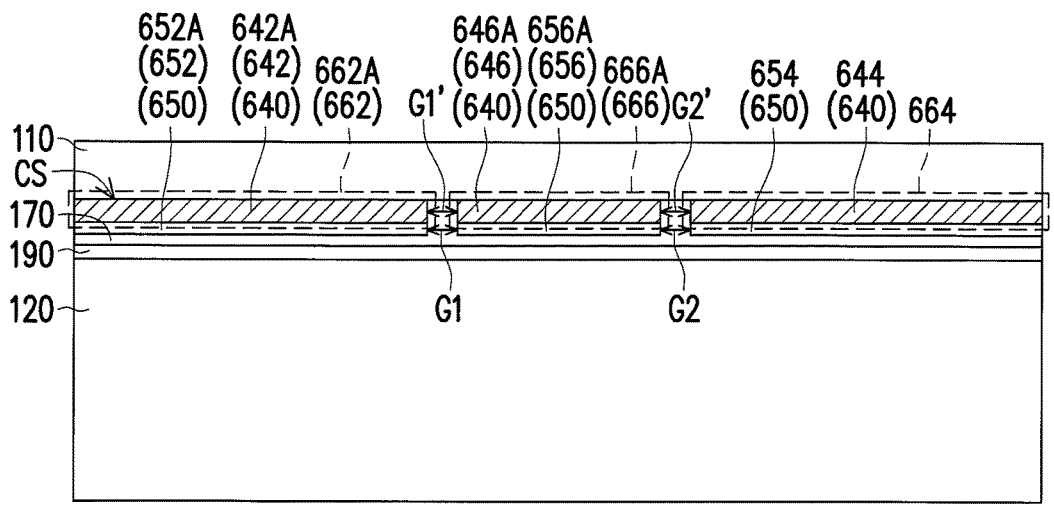
FIG. 6C is a cross-sectional view of the optical film with touch function of the embodiment of FIG. 6A along line II-II.
Figure 6D:
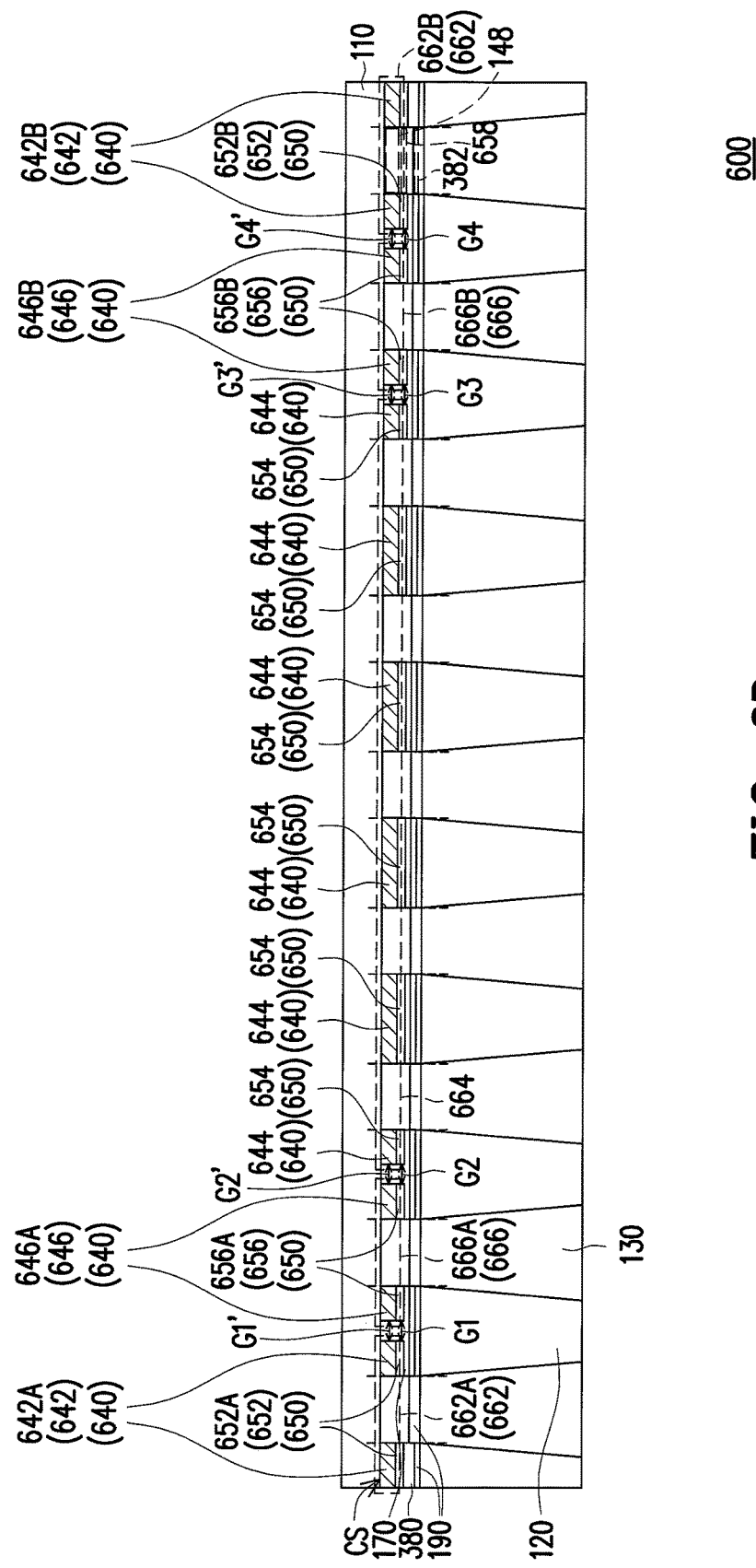
FIG. 6D is a cross-sectional view of the optical film with touch function of the embodiment of FIG. 6A along line III-III.

FIG. 6A is a top view of an optical film with touch function of still yet another embodiment of the disclosure, FIG. 6B is a cross-sectional view of the optical film with touch function of the embodiment of FIG. 6A along line I-I, FIG. 6C is a cross-sectional view of the optical film with touch function of the embodiment of FIG. 6A along line II-II, and FIG. 6D is a cross-sectional view of the optical film with touch function of the embodiment of FIG. 6A along line III-III. Please refer to all of FIG. 6A to FIG. 6D. In the present embodiment, an optical film 600 with touch function is similar to the optical film 400 with touch function of the embodiment of FIG. 4A. The components and relevant descriptions of the optical film 600 with touch function are as presented for the relevant descriptions of the optical film 400 with touch function, and are therefore not repeated herein. The difference between the optical film 600 with touch function and the optical film 400 with touch function is that, a reflective layer 650 of the optical film 600 with touch function is not electrically conductive. Moreover, the filter layer 640 of the optical film 600 with touch function is electrically conductive, and the first sub-filter regions 642A and 642B are electrically insulated from the second filter region 644.

In the present embodiment, the filter layer 640 includes a first filter region 642 (first sub-filter regions 642A and 642B), a second filter region 644, and a third filter region 646 (third sub-filter regions 646A and 646B). Moreover, the reflective layer 650 includes a first reflective region 652 (first sub-reflective regions 652A and 652B), a second reflective region 654, and a third reflective region 656 (third sub-reflective regions 656A and 656B). In the present embodiment, a first electrode region 662 includes first sub-electrode regions 662A and 662B, and a third electrode region 666 includes third sub-electrode regions 666A and 666B. The first sub-electrode region 662A includes the first sub-filter region 642A, the first sub-electrode region 662B includes the first sub-filter region 642B, the second electrode region 664 includes the second filter region 644, the third sub-electrode region 666A includes the third sub-filter region 646A, and the third sub-electrode region 666B includes the third sub-filter region 646B. Moreover, the optical film 600 with touch function includes the insulating layer 170 and the connecting layer 380. The insulating layer 170 is disposed between the filter layer 640 and the material layer 120, and the connecting layer 380 is disposed between the insulating layer 170 and the material layer 120. The insulating layer 170 connects the first sub-filter regions 642A and 642B and the second filter region 644, and the connecting layer 380 connects the first sub-filter regions 642A and 642B. In the present embodiment, the insulating layer 170 is not electrically conductive, and the connecting layer 380 is electrically conductive.

In the present embodiment, the filter electrode layer includes a plurality of sensing electrode regions, and the sensing electrode regions are electrically insulated from one another. The first filter region 642 is defined as a sensing electrode region and the second filter region 644 is defined as another sensing electrode region. The sensing electrode region defined by the first filter region 642 (first sub-filter regions 642A and 642B) is used as one of the driving electrode and the sensing electrode in capacitive touch, and the sensing electrode region defined by the second filter region 644 is used as the other one of the driving electrode and the sensing electrode in capacitive touch. Moreover, the third filter region 646 (third sub-filter regions 646A and 646B) is used as a dummy electrode disposed between the driving electrode and the sensing electrode.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. A vertical projection of the first reflective region 652 on the carrying surface CS falls within the range of a vertical projection of the first filter region 642 on the carrying surface CS, and a vertical projection of the second reflective region 654 on the carrying surface CS falls within the range of a vertical projection of the second filter region 644 on the carrying surface CS. Moreover, a vertical projection of the third reflective region 656 on the carrying surface CS falls within the range of a vertical projection of the third filter region 646 on the carrying surface CS. When the user views the optical film 600 with touch function from another side of the substrate 110 opposite to the carrying surface CS, the user at least does not see the first sub-reflective region 652A, the first sub-reflective region 652B, the second reflective region 654, the third sub-reflective region 656A, and the third sub-reflective region 656B. When the user sees the image frame via the plurality of first openings 148 and the plurality of second openings 158, the user does not see the reflective layer 650. Therefore, the reflective layer 650 does not compromise the light uniformity of the optical film 600 with touch function, such that the light uniformity of the optical film 600 with touch function of the present embodiment is good and costs are lower, as is the case of the optical film 100 with touch function of the embodiment of FIG. 1A. Moreover, since in the present embodiment, a vertical projection of the first openings 148 connected to the third openings 382 of the connecting layer 380 on the carrying surface CS falls within the range of a vertical projection of the third openings 382 on the carrying surface CS, the light intensity of the optical film 600 with touch function of the present embodiment is increased and the light uniformity thereof is good, as is the case of the optical film 300 with touch function of the embodiment of FIG. 3A.

Figure 7A:
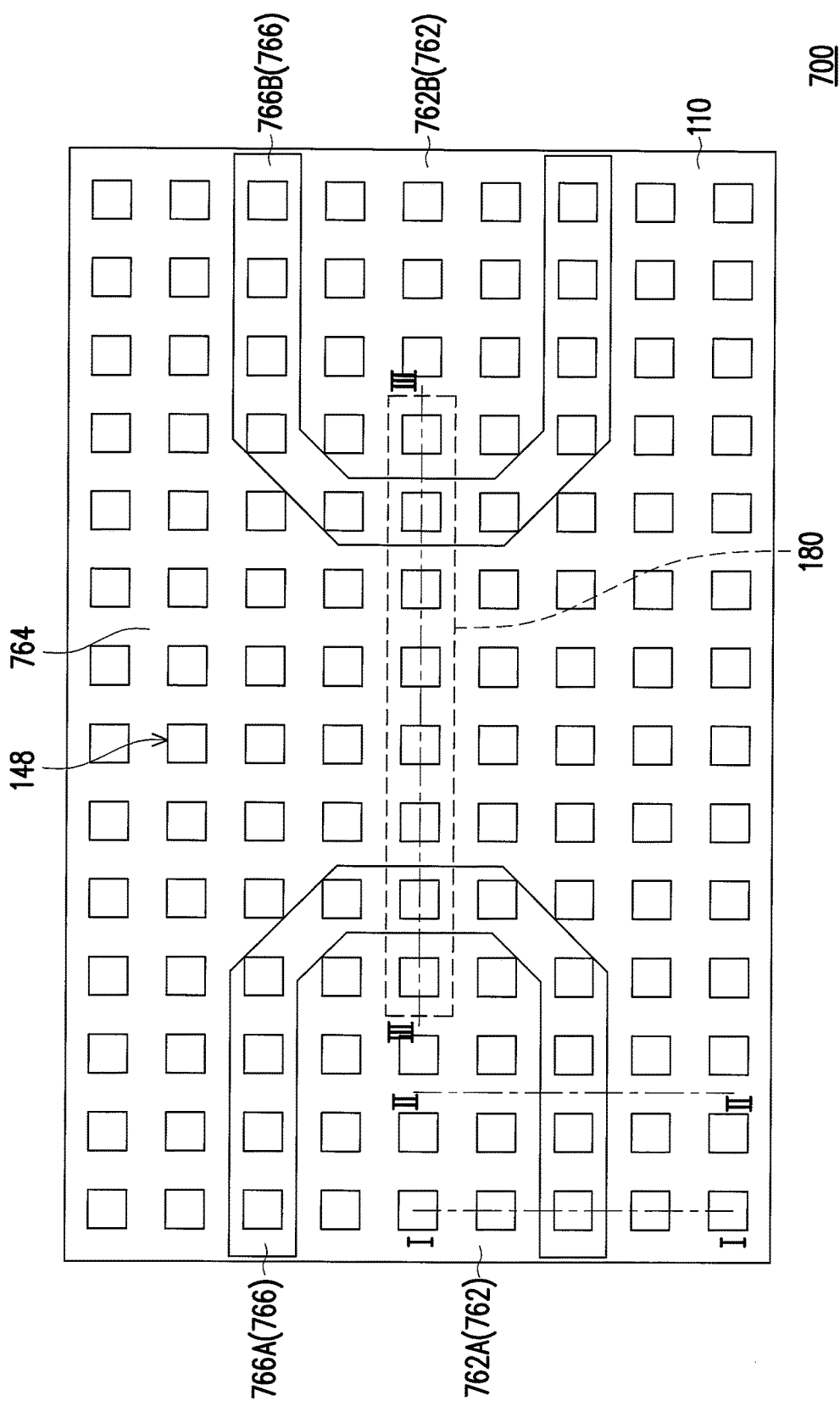
FIG. 7A is a top view of an optical film with touch function of still yet another embodiment of the disclosure.
Figure 7B:
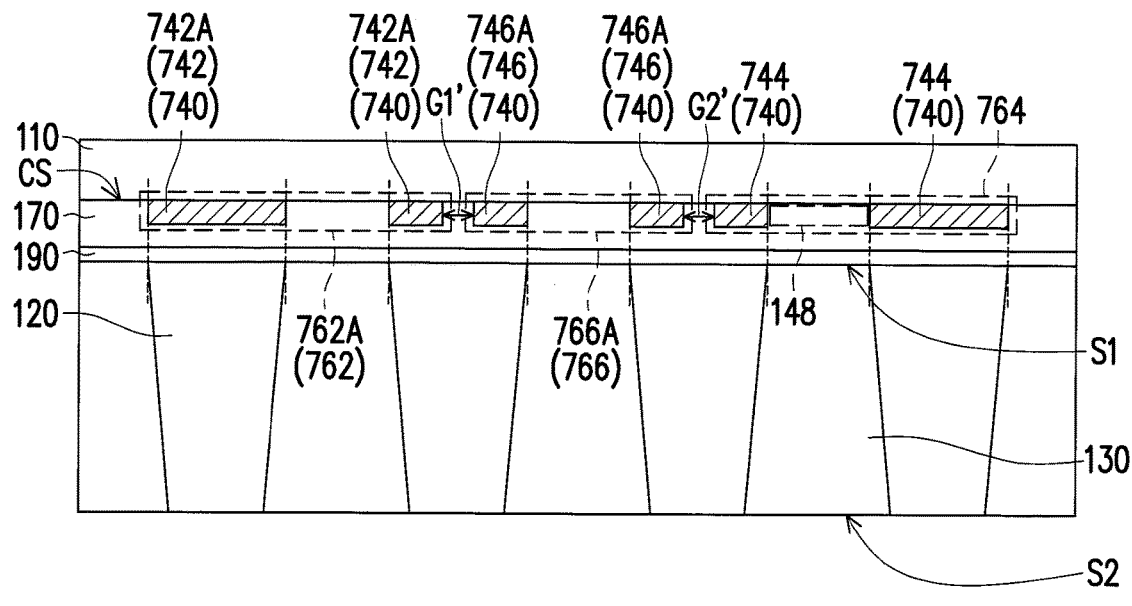
FIG. 7B is a cross-sectional view of the optical film with touch function of the embodiment of FIG. 7A along line I-I.
Figure 7C:
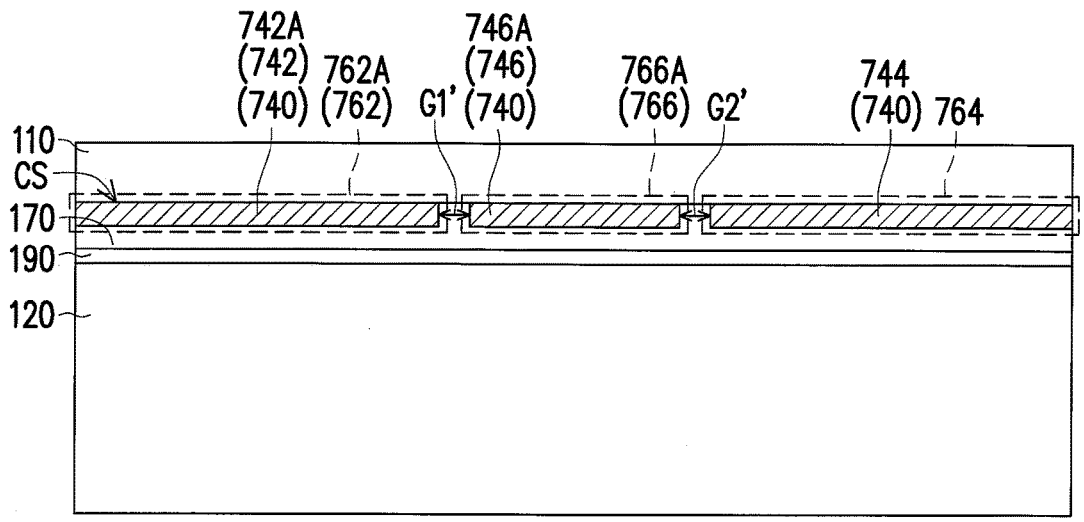
FIG. 7C is a cross-sectional view of the optical film with touch function of the embodiment of FIG. 7A along line II-II.
Figure 7D:
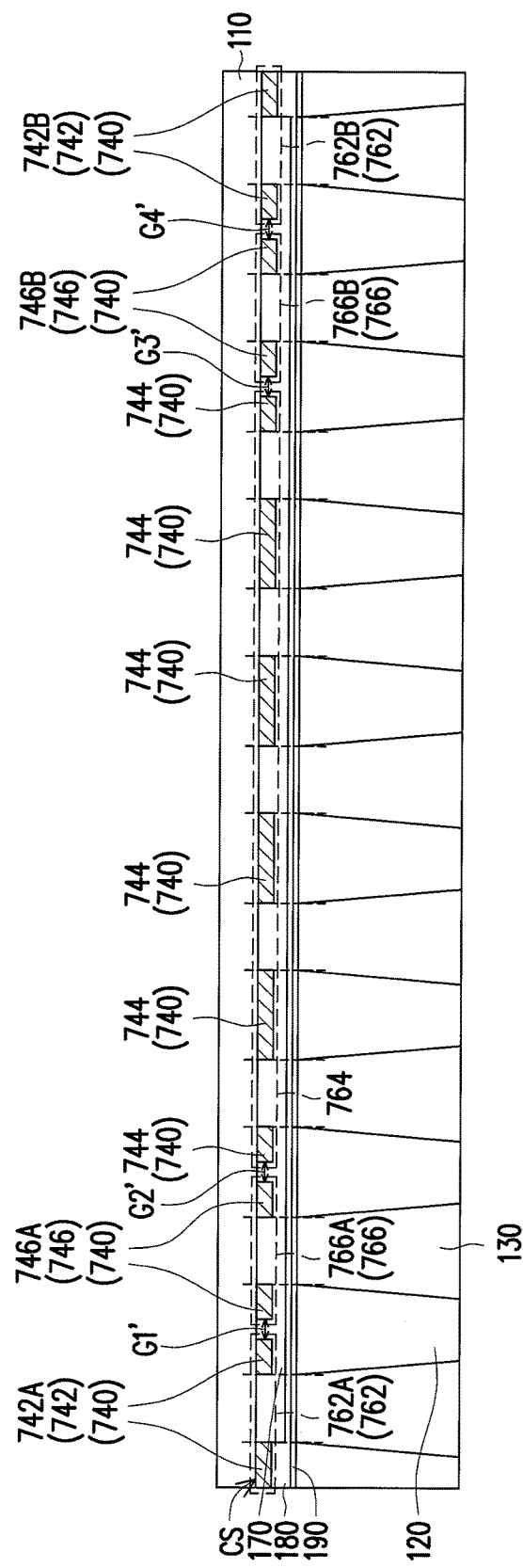
FIG. 7D is a cross-sectional view of the optical film with touch function of the embodiment of FIG. 7A along line III-III.

FIG. 7A is a top view of an optical film with touch function of still yet another embodiment of the disclosure, FIG. 7B is a cross-sectional view of the optical film with touch function of the embodiment of FIG. 7A along line I-I, FIG. 7C is a cross-sectional view of the optical film with touch function of the embodiment of FIG. 7A along line II-II, and FIG. 7D is a cross-sectional view of the optical film with touch function of the embodiment of FIG. 7A along line III-III. Please refer to all of FIG. 7A to FIG. 7D. In the present embodiment, an optical film 700 with touch function is similar to the optical film 200 with touch function of the embodiment of FIG. 2A. The components and relevant descriptions of the optical film 700 with touch function are as presented for the relevant descriptions of the optical film 200 with touch function, and are therefore not repeated herein. The difference between the optical film 700 with touch function and the optical film 200 with touch function is that, the optical film 700 with touch function does not have a reflective layer. Moreover, a filter layer 740 of the optical film 700 with touch function is electrically conductive, and the first sub-filter regions 742A and 742B are electrically insulated from the second filter region 744.

In the present embodiment, the filter layer 740 includes a first filter region 742 (first sub-filter regions 742A and 742B), a second filter region 744, and a third filter region 746 (third sub-filter regions 746A and 746B). In the present embodiment, a first electrode region 762 includes first sub-electrode regions 762A and 762B, and a third electrode region 766 includes third sub-electrode regions 766A and 766B. The first sub-electrode region 762A includes the first sub-filter region 742A, the first sub-electrode region 762B includes the first sub-filter region 742B, the second electrode region 764 includes the second filter region 744, the third sub-electrode region 766A includes the third sub-filter region 746A, and the third sub-electrode region 766B includes the third sub-filter region 746B. Moreover, the optical film 700 with touch function includes the insulating layer 170 and the connecting layer 180. The insulating layer 170 is disposed between the filter layer 740 and the material layer 120, and the connecting layer 180 is disposed between the insulating layer 170 and the material layer 120. The insulating layer 170 connects the first sub-filter regions 742A and 742B and the second filter region 744, and the connecting layer 180 connects the first sub-filter regions 742A and 742B. In the present embodiment, the insulating layer 170 is not electrically conductive, and the connecting layer 180 is electrically conductive.

In the present embodiment, the filter electrode layer includes a plurality of sensing electrode regions, and the sensing electrode regions are electrically insulated from one another. The first filter region 742 is defined as a sensing electrode region and the second filter region 744 is defined as another sensing electrode region. The sensing electrode region defined by the first filter region 742 (first sub-filter regions 742A and 742B) is used as one of the driving electrode and the sensing electrode in capacitive touch, and the sensing electrode region defined by the second filter region 744 is used as the other one of the driving electrode and the sensing electrode in capacitive touch. Moreover, the third filter region 746 (third sub-filter regions 746A and 746B) is used as a dummy electrode disposed between the driving electrode and the sensing electrode.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. When the user views the optical film 700 with touch function at another side of the substrate 110 opposite to the carrying surface CS, the user at least does not see the reflective layer. Therefore, the reflective layer does not compromise the light uniformity of the optical film 700 with touch function, such that the light uniformity of the optical film 700 with touch function of the present embodiment is good and costs are lower, as is the case of the optical film 100 with touch function of the embodiment of FIG. 1A.

Figure 8A:
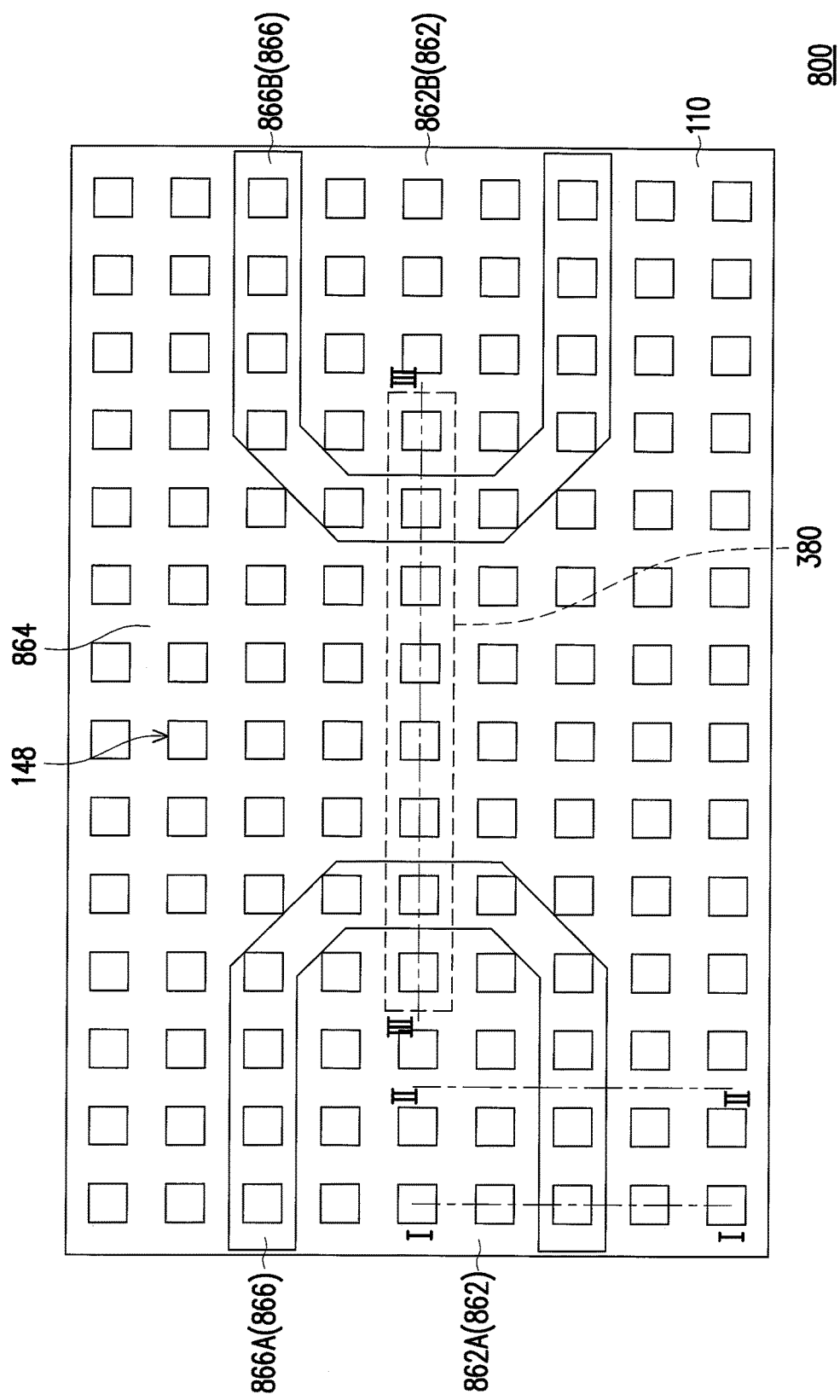
FIG. 8A is a top view of an optical film with touch function of still yet another embodiment of the disclosure.
Figure 8B:
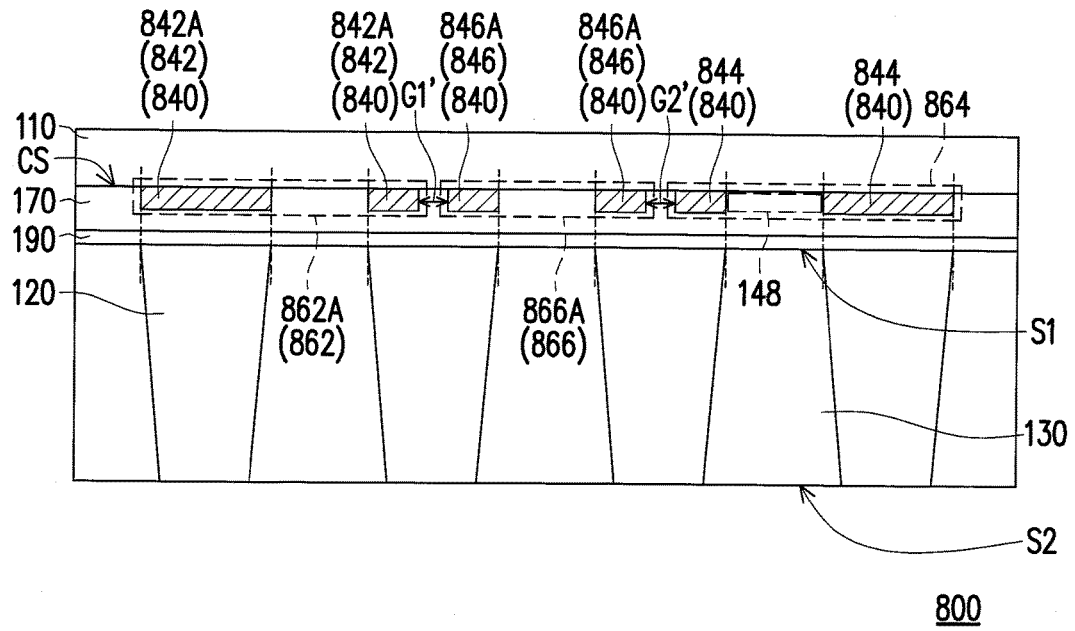
FIG. 8B is a cross-sectional view of the optical film with touch function of the embodiment of FIG. 8A along line I-I.
Figure 8C:
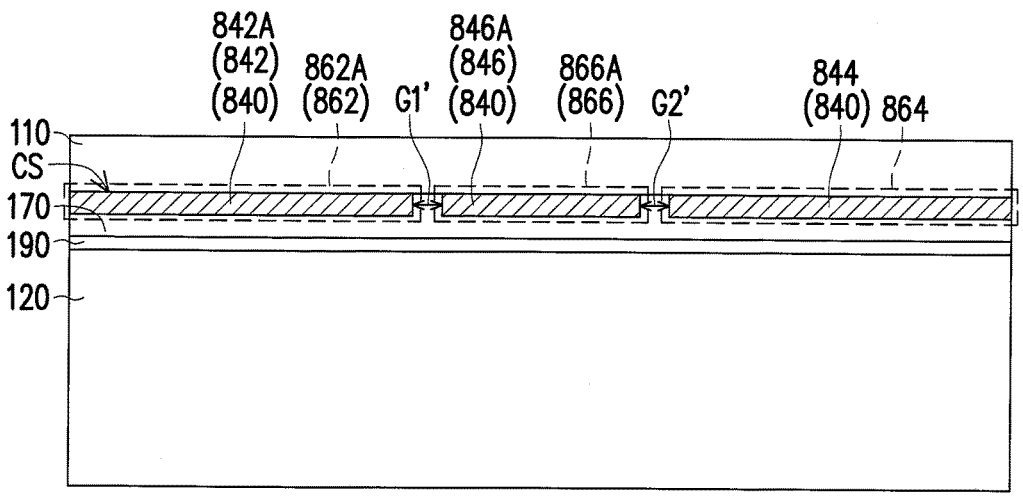
FIG. 8C is a cross-sectional view of the optical film with touch function of the embodiment of FIG. 8A along line II-II.
Figure 8D:
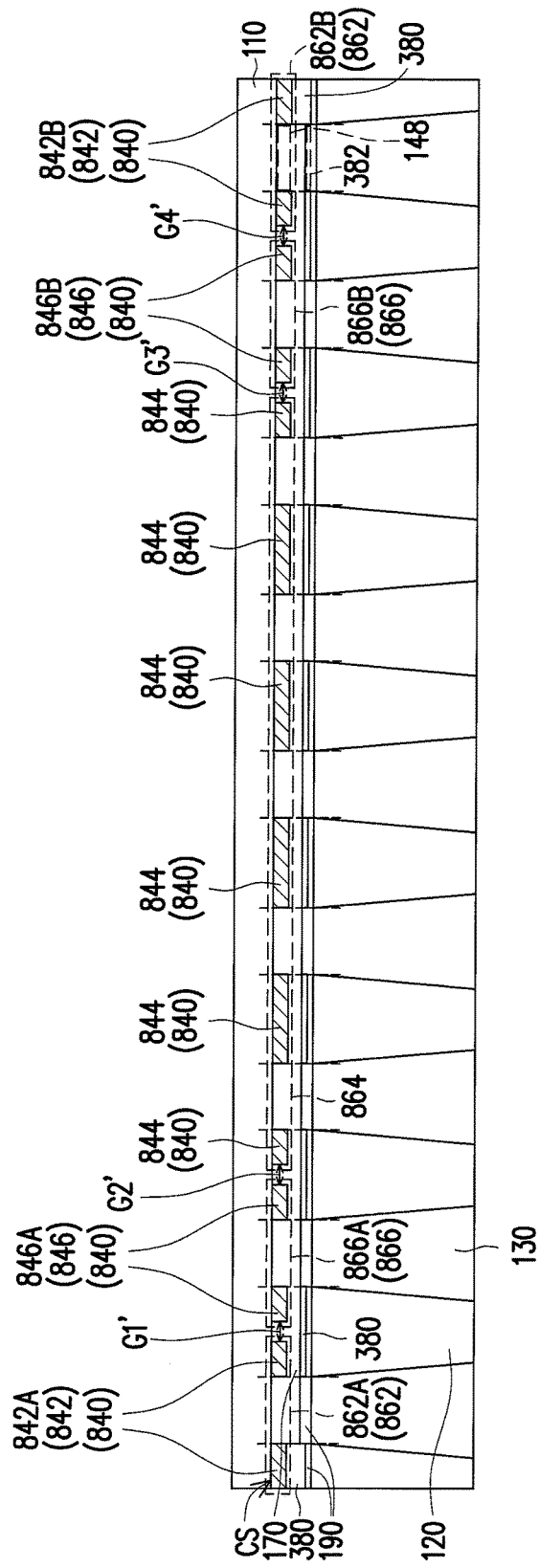
FIG. 8D is a cross-sectional view of the optical film with touch function of the embodiment of FIG. 8A along line III-III.

FIG. 8A is a top view of an optical film with touch function of still yet another embodiment of the disclosure, FIG. 8B is a cross-sectional view of the optical film with touch function of the embodiment of FIG. 8A along line I-I, FIG. 8C is a cross-sectional view of the optical film with touch function of the embodiment of FIG. 8A along line II-II, and FIG. 8D is a cross-sectional view of the optical film with touch function of the embodiment of FIG. 8A along line III-III. Please refer to all of FIG. 8A to FIG. 8D. In the present embodiment, an optical film 800 with touch function is similar to the optical film 400 with touch function of the embodiment of FIG. 4A. The components and relevant descriptions of the optical film 800 with touch function are as presented for the relevant descriptions of the optical film 400 with touch function, and are therefore not repeated herein. The difference between the optical film 800 with touch function and the optical film 400 with touch function is that, the optical film 800 with touch function does not have a reflective layer. Moreover, a filter layer 840 of the optical film 800 with touch function is electrically conductive, and the first sub-filter regions 842A and 842B are electrically insulated from the second filter region 844.

In the present embodiment, the filter layer 840 includes a first filter region 842 (first sub-filter regions 842A and 842B), a second filter region 844, and a third filter region 846 (third sub-filter regions 846A and 846B). In the present embodiment, the first electrode region 862 includes first sub-electrode regions 862A and 862B, and the third electrode region 866 includes third sub-electrode regions 866A and 866B. The first sub-electrode region 862A includes the first sub-filter region 842A, the first sub-electrode region 862B includes the first sub-filter region 842B, the second electrode region 864 includes the second filter region 844, the third sub-electrode region 866A includes the third sub-filter region 846A, and the third sub-electrode region 866B includes the third sub-filter region 846B. Moreover, the optical film 800 with touch function includes the insulating layer 170 and the connecting layer 380. The insulating layer 170 is disposed between the filter layer 840 and the material layer 120, and the connecting layer 380 is disposed between the insulating layer 170 and the material layer 120. The insulating layer 170 connects the first sub-filter regions 842A and 842B and the second filter region 844, and the connecting layer 380 connects the first sub-filter regions 842A and 842B. In the present embodiment, the insulating layer 170 is not electrically conductive, and the connecting layer 380 is electrically conductive.

In the present embodiment, the filter electrode layer includes a plurality of sensing electrode regions, and the sensing electrode regions are electrically insulated from one another. The first filter region 842 is defined as a sensing electrode region and the second filter region 844 is defined as another sensing electrode region. The sensing electrode region defined by the first filter region 842 (first sub-filter regions 842A and 842B) is used as one of the driving electrode and the sensing electrode in capacitive touch, and the sensing electrode region defined by the second filter region 844 is used as the other one of the driving electrode and the sensing electrode in capacitive touch. Moreover, the third filter region 846 (third sub-filter regions 846A and 846B) is used as a dummy electrode disposed between the driving electrode and the sensing electrode.

In the present embodiment, the filter electrode layer includes a plurality of sensing electrode regions, and the sensing electrode regions are electrically insulated from one another. The filter electrode layer has a plurality of openings, and the openings respectively expose the first end surfaces S1. When the user views the optical film 800 with touch function at another side of the substrate 110 opposite to the carrying surface CS, the user at least does not see the reflective layer. Therefore, the reflective layer does not compromise the light uniformity of the optical film 800 with touch function, such that the light uniformity of the optical film 800 with touch function of the present embodiment is good and costs are lower, as is the case of the optical film 100 with touch function of the embodiment of FIG. 1A. Moreover, since in the present embodiment, a vertical projection of the first openings 148 connected to the third openings 382 of the connecting layer 380 on the carrying surface CS falls within the range of a vertical projection of the third openings 382 on the carrying surface CS, the light intensity of the optical film 800 with touch function of the present embodiment is increased and the light uniformity thereof is good, as is the case of the optical film 300 with touch function of the embodiment of FIG. 3A.

Based on the above, a plurality of columnar structures of the optical film with touch function of an embodiment of the disclosure is disposed in the material layer. A side of each of the columnar structures adjacent to the substrate has a first end surface. The filter electrode layer is disposed between the substrate and the material layer. The filter electrode layer includes a plurality of sensing electrode regions electrically insulated from one another. The filter electrode layer has a plurality of openings, and the openings respectively expose the first end surfaces. Therefore, the light uniformity of the optical film with touch function is good.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical film with touch function, comprising:
a substrate having a carrying surface;
a material layer disposed on the carrying surface of the substrate;
a plurality of columnar structures separately disposed in the material layer, wherein each of the columnar structures is extended from a side of the material layer adjacent to the carrying surface to a side of the material layer away from the carrying surface, and a side of each of the columnar structures adjacent to the substrate has a first end surface; and
a filter electrode layer disposed between the substrate and the material layer, and comprising a plurality of sensing electrode regions electrically insulated from each other, wherein the filter electrode layer has a plurality of openings, and the openings respectively expose the first end surfaces.

2. The optical film with touch function of claim 1, wherein the filter electrode layer comprises at least one of a filter layer and a reflective layer.

3. The optical film with touch function of claim 2, wherein the filter electrode layer comprises the filter layer and the reflective layer, the reflective layer is disposed between the filter layer and the material layer, the filter layer comprises a first filter region and a second filter region, and the reflective layer comprises a first reflective region and a second reflective region, wherein a vertical projection of the first reflective region on the carrying surface falls within a range of a vertical projection of the first filter region on the carrying surface, and a vertical projection of the second reflective region on the carrying surface falls within a range of a vertical projection of the second filter region on the carrying surface.

4. The optical film with touch function of claim 3, wherein the filter layer has a plurality of first openings, the reflective layer has a plurality of second openings, and each of the first openings is connected to one of the second openings to form one of the openings of the filter electrode layer, and a vertical projection of the first openings on the carrying surface is overlapped with a vertical projection of the first end surfaces of the columnar structures on the carrying surface.

5. The optical film with touch function of claim 4, wherein the first filter region comprises a plurality of first sub-filter regions, and the first sub-filter regions are separated from each other, wherein the second filter region is disposed between two adjacent first sub-filter regions, and the first reflective region in a direction from each of the first sub-filter regions and perpendicular to the carrying surface is defined as a first sub-reflective region.

6. The optical film with touch function of claim 5, wherein the filter layer further comprises a third filter region, the reflective layer further comprises a third reflective region, a vertical projection of the third reflective region on the carrying surface falls within a range of a vertical projection of the third filter region on the carrying surface, and the third filter region comprises a plurality of third sub-filter regions, wherein the third sub-filter regions are disposed between adjacent first sub-filter regions and the second filter region, and the third reflective region in a direction from each of the third sub-filter regions and perpendicular to the carrying surface is defined as a third sub-reflective region.

7. The optical film with touch function of claim 5, further comprising an insulating layer and a connecting layer, wherein the insulating layer is disposed between the reflective layer and the material layer, and the connecting layer is disposed between the insulating layer and the material layer, wherein the insulating layer is not electrically conductive, and the reflective layer and the connecting layer are electrically conductive, wherein the insulating layer connects the first sub-reflective regions and the second reflective region, the first sub-reflective regions are electrically insulated from the second reflective region, the connecting layer connects the first sub-reflective regions, and the first sub-reflective regions are electrically conducted with each other.

8. The optical film with touch function of claim 7, wherein the filter layer is not electrically conductive, and the first sub-filter regions are connected to the second filter region, wherein the first reflective region is defined as one of the sensing electrode regions, and the second reflective region is defined as another one of the sensing electrode regions.

9. The optical film with touch function of claim 7, wherein the filter layer is electrically conductive, and the first sub-filter regions are electrically insulated from the second filter region, wherein the first filter region and the first reflective region are defined as one of the sensing electrode regions, and the second filter region and the second reflective region are defined as another one of the sensing electrode regions.

10. The optical film with touch function of claim 9, wherein the filter layer comprises a conductive material containing carbon black, a metal material containing chromium, titanium, or nickel, or an oxide material containing chromium, titanium, or nickel.

11. The optical film with touch function of claim 2, wherein the filter electrode layer comprises the filter layer, and the filter layer comprises a first filter region and a second filter region, wherein the filter layer has a plurality of first openings, and a vertical projection of the first openings on the carrying surface is overlapped with a vertical projection of the first end surfaces of the columnar structures on the carrying surface.

12. The optical film with touch function of claim 11, further comprising the reflective layer disposed between the filter layer and the material layer, wherein the reflective layer comprises a first reflective region and a second reflective region, a vertical projection of the first reflective region on the carrying surface falls within a range of a vertical projection of the first filter region on the carrying surface, and a vertical projection of the second reflective region on the carrying surface falls within a range of a vertical projection of the second filter region on the carrying surface, wherein the reflective layer has a plurality of second openings, and each of the first openings is connected to one of the second openings to form one of the openings of the filter electrode layer.

13. The optical film with touch function of claim 12, wherein the first filter region comprises a plurality of first sub-filter regions, and the first sub-filter regions are separated from each other, wherein the second filter region is disposed between two adjacent first sub-filter regions, and the first reflective region in a direction from each of the first sub-filter regions and perpendicular to the carrying surface is defined as a first sub-reflective region.

14. The optical film with touch function of claim 13, wherein the filter layer further comprises a third filter region, the reflective layer further comprises a third reflective region, a vertical projection of the third reflective region on the carrying surface falls within a range of a vertical projection of the third filter region on the carrying surface, and the third filter region comprises a plurality of third sub-filter regions, wherein the third sub-filter regions are disposed between adjacent first sub-filter regions and the second filter region, and the third reflective region in a direction from each of the third sub-filter regions and perpendicular to the carrying surface is defined as a third sub-reflective region.

15. The optical film with touch function of claim 13, further comprising an insulating layer and a connecting layer, wherein the insulating layer is disposed between the filter layer and the material layer, and the connecting layer is disposed between the insulating layer and the material layer, wherein the insulating layer connects the first sub-filter regions and the second filter region, the connecting layer connects the first sub-filter regions, the insulating layer is not electrically conductive, and the connecting layer is electrically conductive.

16. The optical film with touch function of claim 15, wherein the filter layer is electrically conductive, the reflective layer is not electrically conductive, and the first sub-filter regions are electrically insulated from the second filter region, wherein the first filter region is defined as one of the sensing electrode regions, and the second filter region is defined as another one of the sensing electrode regions.

17. The optical film with touch function of claim 11, wherein the first filter region comprises a plurality of first sub-filter regions, the first sub-filter regions are separated from each other, and the second filter region is disposed between two adjacent first sub-filter regions.

18. The optical film with touch function of claim 17, wherein the filter layer further comprises a third filter region, the third filter region comprises a plurality of third sub-filter regions, and the third sub-filter regions are disposed between adjacent first sub-filter regions and the second filter region.

19. The optical film with touch function of claim 17, further comprising an insulating layer and a connecting layer, wherein the insulating layer is disposed between the filter layer and the material layer, and the connecting layer is disposed between the insulating layer and the material layer, wherein the insulating layer connects the first sub-filter regions and the second filter region, the connecting layer connects the first sub-filter regions, the insulating layer is not electrically conductive, and the connecting layer is electrically conductive.

20. The optical film with touch function of claim 19, wherein the filter layer is electrically conductive, the first sub-filter regions are electrically insulated from the second filter region, the first filter region is defined as one of the sensing electrode regions, and the second filter region is defined as another one of the sensing electrode regions.

* * * * *